United States Patent [19]
Kubon

[11] Patent Number: 5,682,030
[45] Date of Patent: Oct. 28, 1997

[54] METHOD AND APPARATUS FOR DECODING BAR CODE DATA FROM A VIDEO SIGNAL AND APPLICATION THEREOF

[76] Inventor: Daniel George Kubon, 327 Summer Pl., Peachtree City, Ga. 30269

[21] Appl. No.: 486,159

[22] Filed: Jun. 7, 1995

Related U.S. Application Data

[63] Continuation of Ser. No. 133,520, Oct. 7, 1993, abandoned, which is a continuation-in-part of Ser. No. 12,528, Feb. 2, 1993, abandoned.

[51] Int. Cl.$^6$ .................................................. G06K 7/10
[52] U.S. Cl. .................................... 235/462; 235/463
[58] Field of Search .................................. 235/462, 463, 235/471, 440; 358/93, 107

[56] References Cited

U.S. PATENT DOCUMENTS

| | | | |
|---|---|---|---|
| 3,246,126 | 4/1966 | Schlieben et al. | 235/471 |
| 3,774,014 | 11/1973 | Berler | 235/61.11 E |
| 3,854,035 | 12/1974 | Tyler et al. | 235/61.11 E |
| 3,868,634 | 2/1975 | Dolch | 235/471 |
| 3,902,047 | 8/1975 | Tyler et al. | 235/61.11 E |
| 4,044,227 | 8/1977 | Holm et al. | 235/61.7 |
| 4,192,452 | 3/1980 | Hashimoto | 235/471 |
| 4,237,163 | 12/1980 | Collins, Jr. et al. | 235/472 |
| 4,357,624 | 11/1982 | Greenberg | 358/22 |
| 4,544,064 | 10/1985 | Felder | 209/583 |
| 4,567,361 | 1/1986 | Rosenthal | 235/462 |
| 4,578,568 | 3/1986 | Tsuzuki | 235/436 |
| 4,680,457 | 7/1987 | Robertson | 235/471 |
| 4,736,109 | 4/1988 | Dvorzsak | 250/566 |
| 4,746,789 | 5/1988 | Gieles et al. | 235/463 |
| 4,760,247 | 7/1988 | Keane et al. | 235/454 |
| 4,776,464 | 10/1988 | Miller et al. | 209/3.3 |
| 4,806,741 | 2/1989 | Robertson | 235/462 |
| 4,812,631 | 3/1989 | Hiramatsu | 235/467 |
| 4,814,869 | 3/1989 | Oliver, Jr. | 358/108 |
| 4,825,093 | 4/1989 | Kiriseko et al. | 250/566 |
| 4,902,883 | 2/1990 | Poland | 235/462 |
| 4,943,864 | 7/1990 | Elberbaum | 358/108 |
| 4,958,064 | 9/1990 | Kirkpatrick | 235/384 |
| 4,963,756 | 10/1990 | Quan et al. | 250/568 |
| 4,969,038 | 11/1990 | Lemelson | 358/107 |
| 4,985,115 | 1/1991 | De Rossett, Jr. | 156/654 |
| 4,989,085 | 1/1991 | Elberbaum | 358/108 |
| 4,992,649 | 2/1991 | Mampe et al. | 235/462 |
| 4,999,617 | 3/1991 | Uemura et al. | 235/471 X |
| 5,010,242 | 4/1991 | Frontino | 235/467 |
| 5,034,817 | 7/1991 | Everett, Jr. | 358/160 |

(List continued on next page.)

FOREIGN PATENT DOCUMENTS

| | | | |
|---|---|---|---|
| 0036950 | 10/1981 | European Pat. Off. | 235/462 |
| 2346778 | 12/1977 | France | 235/462 |
| 5660976 | 5/1981 | Japan | 235/462 |
| 2-33685 | 2/1990 | Japan | G06K 7/10 |
| 2167221 | 5/1986 | United Kingdom | 235/462 |

OTHER PUBLICATIONS

"Vision System Reads Matrix Code", Automatic I.D. News, Apr. 1, 1993, vol. 9, No. 4, p. 55.

*Primary Examiner*—Donald T. Hajec
*Assistant Examiner*—Jeffrey R. Filipek
*Attorney, Agent, or Firm*—Troutman Sanders LLP; Joel S. Goldman; Kenneth Southall

[57] ABSTRACT

A new technology in bar code scanning and digitizing is provided where a bar code within a composite video signal may be detected and decoded. In a preferred embodiment, the composite video signal is converted into a form suitable for providing to a bar code decoder, in order that any bar code within the video signal may be decoded by the decoder. The output of the bar code decoder may thereafter be provided to, for example, a computer for the further processing. For purposes of the present invention, the composite video signal which is decoded may be generated by a video camera, a video tape recorder, a television signal, or any other source which generates such a video signal. A sampling of the multitude of possible applications of the present invention is also provided, whereby bar codes detected by, for example, video cameras in different environments may be decoded and processed by a computer.

25 Claims, 13 Drawing Sheets

U.S. PATENT DOCUMENTS

| | | | |
|---|---|---|---|
| 5,073,954 | 12/1991 | Van Tyne et al. | 382/18 |
| 5,103,080 | 4/1992 | Barkan | 235/437 |
| 5,119,205 | 6/1992 | Lemelson | 358/93 |
| 5,120,940 | 6/1992 | Willsie | 235/462 |
| 5,124,537 | 6/1992 | Chandler et al. | 235/462 |
| 5,128,753 | 7/1992 | Lemelson | 358/101 |
| 5,134,272 | 7/1992 | Tsuchiya et al. | 235/462 |
| 5,144,421 | 9/1992 | Lemelson | 358/101 |
| 5,150,212 | 9/1992 | Han | 358/147 |
| 5,159,340 | 10/1992 | Smith | 341/132 |
| 5,192,856 | 3/1993 | Schaham | 235/462 |
| 5,199,084 | 3/1993 | Kishi et al. | 382/48 |
| 5,216,502 | 6/1993 | Katz | 358/108 |
| 5,247,154 | 9/1993 | Ahmed | 219/121.83 |
| 5,267,039 | 11/1993 | Elberbaum | 358/146 |
| 5,268,580 | 12/1993 | He | 250/566 |
| 5,276,315 | 1/1994 | Surka | 235/462 |
| 5,291,008 | 3/1994 | Havens et al. | 235/462 |
| 5,291,009 | 3/1994 | Roustaei | 235/472 |
| 5,294,783 | 3/1994 | Hammond, Jr. et al. | 235/462 |
| 5,306,899 | 4/1994 | Marom et al. | 235/282 |
| 5,319,181 | 6/1994 | Shellhammer et al. | 235/462 |
| 5,329,105 | 7/1994 | Klancnik et al. | 235/463 |

METHOD AND APPARATUS FOR DECODING BAR CODE DATA FROM A VIDEO SIGNAL AND APPLICATION THEREOF

CROSS-REFERENCE TO RELATED APPLICATION

This is a continuation of application Ser. No. 08/133,520, filed on Oct. 7, 1993, now abandoned which application is a continuation-in-part of U.S. patent application Ser. No. 08/012,528, filed on Feb. 2, 1993, abandoned.

BACKGROUND OF THE INVENTION

1. Technical Field

This invention relates generally to bar code technology, and in particular, to a method and apparatus for decoding bar code data from a video signal, as well as the wide range of applications of this technology.

2. Description of the Prior Art

In recent years, the use of bar code technology has become commonplace as a means for efficient data collection. Generally, bar code technology allows for numbers, characters, or other symbols, to be coded into a series of spaced bars and printed onto the surface of particular objects. A bar code scanner may then be used to scan the bar code pattern on the object, the pattern may be decoded, and the underlying coded information may be used as data and acted upon accordingly.

FIG. 1 depicts a block diagram of a typical bar code scanner and decoder of the prior art. Scanner 101 may be used to scan a bar code. Scanner 101 provides a digitized version of the scanned bar code to decoder 102, which decodes the bar code digitized by scanner 101. The output of decoder 102 may then be fed into computer 103.

Traditionally, in order to scan bar codes, dedicated scanners 101 have been used, including (1) wand scanners, (2) hand-held laser guns, (3) CCD scanners and (4) fixed laser scanners. Unfortunately, all of these scanners are designed specifically to scan bar codes, and generally have no use beyond the bar code realm.

In an attempt to circumvent the need to utilize a dedicated scanner to scan bar codes, several alternative forms of scanning technology have been attempted, including the use of bit-mapped video data. For example, in U.S. Pat. No. 5,134,272, Tsuchiya et al., disclose an apparatus for processing an array of picture elements from a source image in order to extract a bar code depicted therein. A complicated series of steps and calculations is performed in order to convert, process and compute the bar code data represented by the picture element array. These steps and calculations are performed by equally complicated components.

In U.S. Pat. No. 5,120,940, Willsie discloses a device for detecting bar codes in binary images. A bar code block within the image is isolated, and, through a series of steps, the background "clutter" (e.g., non-bar code) information is subtracted out of the image. Further processing of the image then occurs, resulting in an image which may be read by a bar code reader.

While the devices disclosed in the above two patents are able to detect a bar code within an image, both of these devices are complicated and relatively slow in nature. Furthermore, both of these devices are limited to analyzing bit-mapped images, where the bar code is embedded within an image which has been converted into a two-dimensional array of picture elements. Thus, neither of these devices, nor any other currently known device, is able to effectively analyze non-rasterized video, such as a standard composite video signal.

The above-described shortcomings, and other shortcomings of prior art bar code technology, are effectively overcome by the present invention, as described in further detail below.

SUMMARY OF THE INVENTION

It is therefore an object of the present invention to provide an improved data collection system.

It is another object of the present invention to provide an improved bar code scanning system.

It is another object of the present invention to provide a system for digitizing a bar code represented within a composite video signal.

It is another object of the present invention to provide a system for digitizing and decoding a bar code represented within a composite video signal.

It is another object of the present invention to provide an inexpensive system for digitizing a bar code represented within a composite video signal.

It is another object of the present invention to provide an efficient system for digitizing a bar code represented within a composite video signal.

It is another object of the present invention to provide a fast system for digitizing a bar code represented within a composite video signal.

It is another object of the present invention to provide a system for digitizing multiple bar codes represented within a composite video signal.

It is another object of the present invention to provide a system for decoding a bar code represented within a composite video signal which does not require that the video signal be converted to a bit-mapped image.

It is another object of the present invention to provide a system for decoding a bar code which does not require dedicated bar code scanning equipment.

It is another object of the present invention to provide a fast system for decoding one or more bar codes within a composite video signal.

It is another object of the present invention to provide a system for decoding codes within the video data portion of a composite video signal.

It is another object of the present invention to provide a system for decoding visual codes represented within a composite video signal.

In accordance with the teachings of the present invention, a new technology in bar code scanning and decoding is provided where a bar code within a composite video signal may be detected and decoded. In a preferred embodiment, the lower signal levels of the composite video signal are clamped to a first specified signal level, so as to remove a lower portion of the negative sync pulses. A high-speed comparator compares the clamped video signal to a second specified signal level, and the output of the comparator is conditioned so as to provide a clean digital (e.g., TTL) representation of the video portion of the composite signal. The resulting signal is fed into a high-speed decoder, which decodes any bar code information contained within the signal. The original composite video signal may also be fed into other video equipment, such as a video monitor, through a voltage follower transistor arrangement, so as to isolate the digitizer of the present invention from such other video equipment.

3

BRIEF DESCRIPTION OF THE DRAWINGS

FIGS. 11(a) and 11(b) depict a block diagram of multiplexers for multiplexing one of a plurality of video input lines into an output line.

DETAILED DESCRIPTION OF THE INVENTION

The present application is a continuation-in-part of U.S. patent application Ser. No. 08/012,528, entitled "Method and Apparatus For Digitizing and Decoding Bar Code Data From A Video Signal" filed Feb. 2, 1993, which is incorporated herein by reference.

Figure 1:
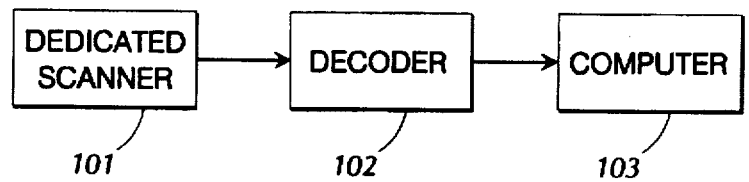
FIG. 1 depicts a block diagram depicting the interaction between a bar code scanner, a decoder and a computer, as conventionally implemented in the prior art.
Figure 2:
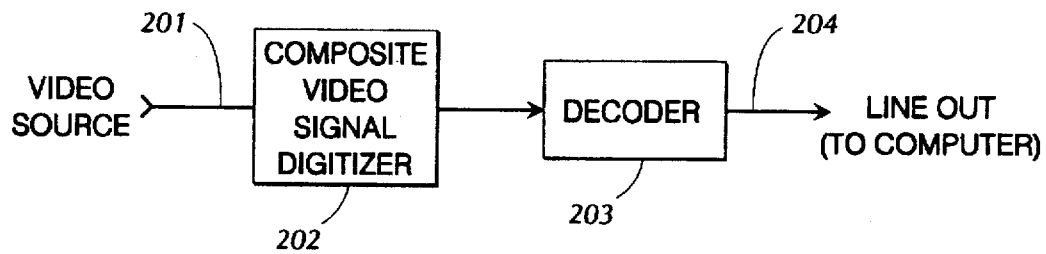
FIG. 2 depicts a block diagram depicting the interaction between a composite video signal digitizer, a decoder and the input and output of these two components, according to a preferred embodiment of the present invention.

Referring to FIG. 2, a block diagram is shown which depicts the general configuration of one embodiment of the present invention. First, composite video signal digitizer 202 is designed so as to receive input from a composite video signal via line 201. The output of digitizer 202 is supplied to bar code decoder 203. Finally, the output of decoder 203 may be supplied to another device, such as a computer, for further processing via line 204.

In a preferred embodiment, the composite video signal supplied to digitizer 202 via line 201 may comprise any standard composite video signal source, such as a composite video signal produced by a video camera, broadcast by a television station, played back from a video tape, or received from any other composite video source. In a preferred embodiment, the composite video signal may comply with any composite video standard, such as NTSC, RS170, PAL, CCIR, SECAM, etc. For example, in the United States, the NTSC standard is widely used for the distribution of television signals, while in Europe the PAL standard is widely used. In a preferred embodiment, the present invention may be utilized with the NTSC standard of composite videos, which normally comprises a one volt peak-to-peak signal, and a scan rate of approximately 15,750 horizontal lines per second.

It will be readily understood by one of ordinary skill in the art that the present invention may be implemented in conjunction with any type of composite video signal. Furthermore, the present invention is not limited to the type of video signal which has commonly become known as a composite video signal, but may also be readily implemented with any video signal within which video data is transmitted on a line-by-line basis.

As a composite video signal is supplied to digitizer 202 via line 201, digitizer 202 processes the video signal so as to convert the video signal into a form suitable for supplying to decoder 202. Thus, in the context of the present invention, the term "digitizing" refers merely to the conversion or conditioning of a video signal from an analog form into a digital counterpart having a one-to-one correspondence with the analog signal. Generally speaking, a video signal may be digitized by converting a voltage level of the video signal above a threshold level to a first high voltage level, and converting a voltage level of the video signal below a threshold level to a second low voltage level. Thus, an approximation of the video signal resulting in either a low or high voltage level (e.g., a digital signal) is obtained. This is explained in further detail below.

Figure 3:
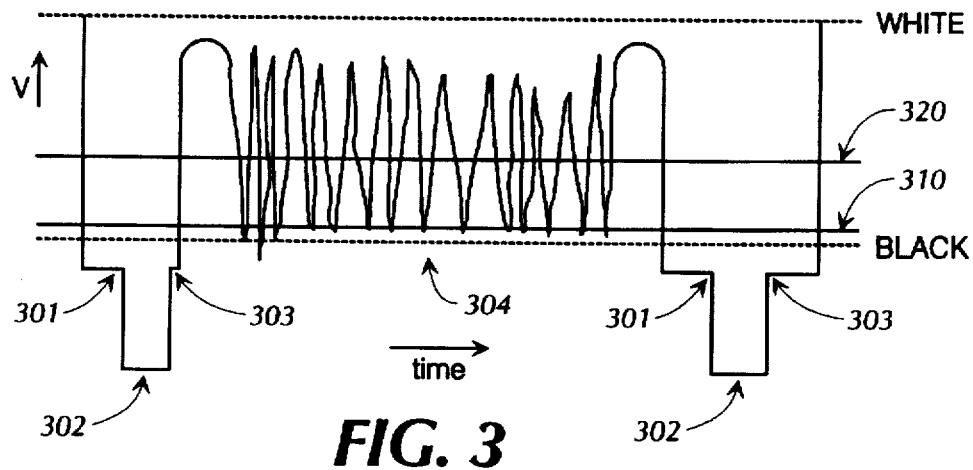
FIG. 3 depicts a waveform of a typical composite video signal which, in a preferred embodiment, may serve as input to the present invention.

FIG. 3 illustrates a composite video waveform of the NTSC type commonly used in the United States. The vertical axis of this waveform corresponds to the voltage level of the video signal at a particular point in time, while the horizontal axis corresponds to time. As this waveform shows, a composite video signal is made up of a variety of different "components". Included among the components of a composite video signal are: blanking pulses 301, synchronization pulses 302, color burst information 303, and video data region 304.

Generally, the various components of a composite video signal allow a television receiver to align and interpret the incoming video signal so as to properly display video data contained within the video signal. For example, each video data region 304 generally corresponds to one horizontal video line to be displayed on the television screen, and blanking pulses 301 and synchronization pulses 302 are used by the television receiver to properly align the video signal so that each video data region 304 is properly decoded and displayed.

In an NTSC signal, blanking pulses 301 may correspond to either a horizontal blanking interval (HBI), which signifies the end of one horizontal line of video data and the beginning of the next horizontal line of video data, or a vertical blanking interval (VBI), which signifies the end of one complete video frame and the beginning of a new video frame. Because a VBI indicates that the horizontal lines are to be displayed again from the top of the video frame, a VBI is normally of a longer duration that an HBI. The video data 304 interspersed between such blanking pulses 301 corresponds to the particular intensities and/or colors of the video to be displayed on the particular horizontal line.

It will be readily recognized that the sample composite video signal waveform of FIG. 3 represents merely one interpretation of a composite video signal. Because composite video signals are commonly modulated onto a high frequency signal, the negative-going blanking pulses 301 and synchronization pulses 302 are often depicted as positive-going pulses, whereby the waveform of FIG. 3 would be mirrored about its horizontal axis. For purposes of the present discussion, however, the blanking pulses and synchronization pulses will be considered to be negative-going, with the discussion of other components of the composite video signal following this convention.

In light of the characteristics of a composite video signal, the present invention is able to process the composite video signal so as to digitize a bar code visually represented by the composite video signal. That is, assuming that a bar code is visually represented within a composite video signal, the present invention is able to convert this bar code into its digital representation, thus allowing bar code decoder 203 to decode the particular bar code, and provide the decoded information to, for example, a computer 204 for further processing.

Figure 4:
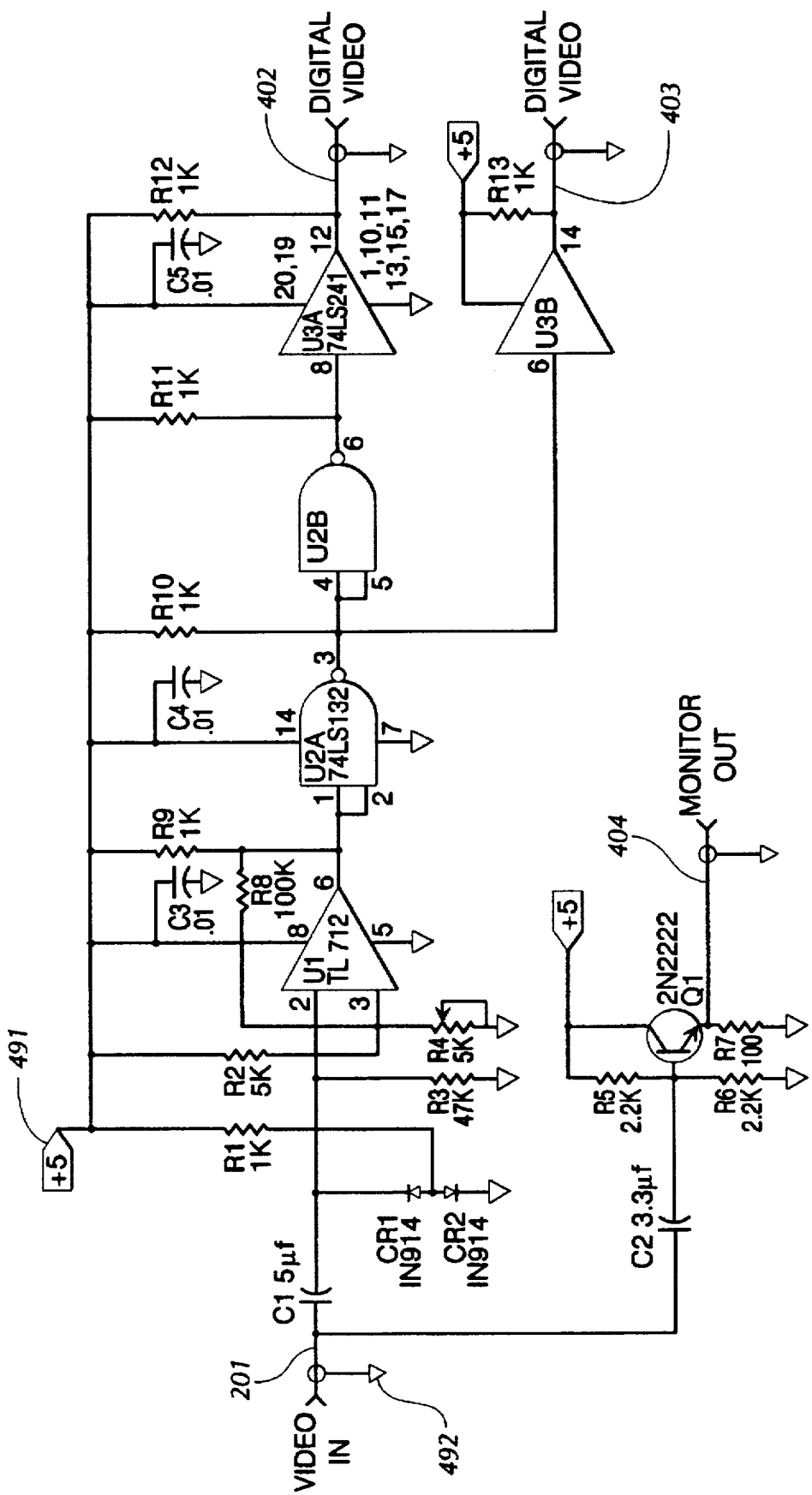
FIG. 4 depicts a schematic diagram of the composite video signal digitizer depicted in FIG. 2, according to a preferred embodiment of the present invention.

FIG. 4 is a schematic diagram providing further detail of the composite video signal digitizer 202 depicted in FIG. 2, in a preferred embodiment. The composite video signal digitizer of FIG. 4 will now be described.

First, the digitizer of FIG. 4 may be powered by way of a 5 volt power source. This power source is indicated in FIG. 4 as reference numerals 491 and 492, with reference numeral 492 corresponding to a common ground level, and reference numeral 491 corresponding to the +5 volt level relative to the ground voltage level. Throughout the schematic diagram of FIG. 4, the +5 volt power supply level is also denoted by a +5 designation within a polygon, and the ground voltage level is similarly denoted as a triangle pointing down.

The composite video signal which is to be digitized and decoded is supplied to the digitizer of FIG. 4 via line 201, which corresponds to line 201 of FIG. 2. As shown in FIG. 4, line 201 is connected to the "−" terminal (pin 2) of comparator U1 through capacitor C1. In a preferred embodiment, capacitor C1 may comprise a 5 micro-farad (μF) non-polarized capacitor commonly available from many sources, and comparator U1 may comprise a TL712 high-speed differential comparator available from Texas Instruments. When a TL712 comparator is used as comparator U1, pin 2 of this particular comparator may be utilized as the "−" terminal.

The "−" terminal of comparator U1 is also connected to the cathode of diode CR1. The anode of diode CR1 is in turn connected to the anode of diode CR2, and the cathode of diode CR2 is connected to ground. The anodes of both CR1 and CR2 are connected to the +5 volt power supply through resistor R1, which may comprise a 1 kilohm (kΩ) resistor in a preferred embodiment. The "−" terminal of comparator U1 is also connected to ground through resistor R3, which may comprise a 47 KΩ resistor. In a preferred embodiment, diodes CR1 and CR2 may comprise IN914 diodes available from National Semiconductor, or an equivalent.

The "+" terminal of comparator U1, which corresponds to pin 3 when comparator U1 is a TL712 high-speed comparator, is connected to the +5 volt power supply through resistor R2, which may comprise a 5 kΩ resistor in a preferred embodiment. The "+" terminal of comparator U1 is also connected to ground through variable resistor R4, which may comprise a 5 kΩ variable resistor in a preferred embodiment. The "+" terminal of comparator U1 is finally connected to the output of comparator U1 (pin 6 of a TL712 comparator) through resistor R8, which may comprise a 100 KΩ resistor in a preferred embodiment.

Comparator U1 may be powered by the +5 volt and ground voltages, which may be supplied to pins 8 and 5, respectively, if a TL712 comparator is used. In order to condition the +5 volt level supplied to comparator U1, capacitor C3 may be placed between the +5 voltage supplied to comparator U1 and ground. In one embodiment, capacitor C3 may comprise a 0.01 F capacitor.

The output of comparator U1 is connected to the +5 volt power supply through resistor R9, and is also supplied to the input of inverter U2A. In one embodiment, resistor R9 may comprise a 1 kΩ resistor. Inverter U2A may comprise a 74LS132 NAND gate, which is commonly available from many sources, such as Motorola, Inc. If a 74LS132 NAND gate is used, then the output of comparator U1 may be supplied directly to both pins 1 and 2 of this device. When a 74LS132 NAND gate is used, power may be supplied from the +5 volt and ground voltage levels via pins 14 and 7, respectively. Additionally, the +5 volt power supply provided to NAND gate U2A by connecting capacitor C4 between pin 14 of NAND gate U2A and ground. In a preferred embodiment, capacitor C4 may comprise a 0.01 F capacitor.

The output of inverter U2A is connected through resistor R10 to the +5 volt power supply, and is also connected to the input of inverter U2B. Like inverter U2A, inverter U2B may also comprise a 74LS132 NAND gate in a preferred embodiment. Because more than one NAND gate is packaged within a 74LS132 device, the NAND gates used as inverters U2A and U2B may reside within one physical 74LS132 device in a preferred embodiment. In this case, output pin 3 of NAND gate U2A is connected to both pins 4 and 5 of NAND gate U2B. Although not specifically shown, inverter U2B may therefore be powered from the same pins as inverter U2A.

The output of inverter U2B, which is pin 6 if inverter U2B is a 74LS132 NAND gate, is connected to the +5 volt power supply through resistor R11, and is also connected to the input of buffer U3A. In a preferred embodiment, resistor R11 may comprise a 1 kΩ resistor. Buffer U3A (along with buffer U3B) may comprise a 74LS241 buffer commonly available from many sources, such as Motorola. Because more than one buffer is packaged on a 74LS241 device, both buffers U3A and U3B may reside within the same physical device in a preferred embodiment.

Thus, the output of inverter U2B may be connected to pin 8 of buffer U3A, if buffer U3A comprises a 74LS241 device. Analogously, the output of inverter U2A may be connected to pin 6 of buffer U3B, if buffer U3B comprises a 74LS241 device. Both buffers U3A and U3B may be powered by the +5 volt and ground supplies, connected to pins 20 and 19 (for +5 volts) and pins 1, 10, 11, 13, 15 and 17 (for ground voltage, and grounding of other buffers not being used), and the +5 voltage supply may be conditioned by connecting capacitor C5 between the +5 voltage supply and ground. In a preferred embodiment, capacitor C5 may comprise a 0.01 F capacitor.

Resistor R12 may be connected between the output of buffer U3A and the +5 volt supply, and resistor R13 may be connected between the output of buffer U3B and the +5 volt supply. In a preferred embodiment, each of these resistors may comprise a 1 kΩ resistor.

In addition to the above-described connections, line 201 may also be connected to the base of transistor Q1 through capacitor C2, which may comprise a 3.3 μF nonpolarized capacitor in a preferred embodiment. Transistor Q1 may comprise a 2N2222 NPN transistor in a preferred embodiment, available from, for example, Motorola. The base of transistor Q1 may also be connected to the +5 volt supply through resistor R5, and to ground through resistor R6. Both resistors R5 and R6 may comprise a 2.2 kΩ resistor in a preferred embodiment.

The collector of transistor Q1 is connected to the +5 volt power supply, and the emitter of transistor Q1 is connected to ground through resistor R7, which may preferably comprise a 100 Ω resistor. Finally, the emitter of transistor Q1 may be connected through line 404 to a monitor (not shown), or any other device capable of receiving a composite video signal.

Figure 5:
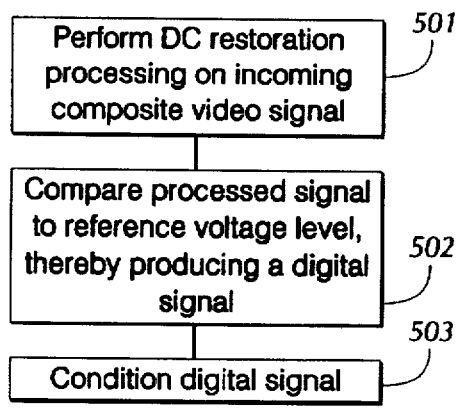
FIG. 5 depicts a flow diagram depicting the operation of the digitizer of FIG. 4, according to a preferred embodiment of the present invention.

The operation of the circuit shown in FIG. 4 will now be described with respect to the flow diagram of FIG. 5. The various steps shown in FIG. 5, as well as the steps depicted in other flow diagrams within the present specification, may be implemented in one embodiment by programming a microprocessor, for example, accordingly, as will be readily understood by a person having ordinary skill in the art.

A composite video signal may be fed into the circuit of FIG. 4 through line 201. In step 501, resistors R1 and R3, capacitor C1, and diodes CR1 and CR2 thereafter perform a direct current (DC) restoration processing of the incoming video signal, in order to align all input levels to the same reference point. That is, regardless of any DC component of the incoming composite video signal, the DC component of the video signal is restored to a specified level in anticipation of further processing by the remainder of the circuit.

It has been found that a suitable DC component for purposes of the present invention is approximately 110 millivolts (mV) above ground, and the component values of resistors R1 and R3, capacitor C1, and diodes CR1 and CR2 have been chosen so as to restore the DC component to the 110 mV level. Of course, another suitable level for DC restoration may be chosen as well, and the present components have been chosen only as one embodiment which has been shown to produce the best known results for a typical video signal.

The DC restoration function processing provided by components R1, R3, C1, CR1 and CR2, and depicted in step 501, also causes a small portion of the bottom of the negative synchronization pulse to be removed from the video signal. This occurs because this negative video signal resides below the 110 mV DC level, and diode CR1 effectively clamps any negative voltage signals at approximately the 110 mV level. The clamping voltage level is depicted by reference numeral 310 in FIG. 3.

It will be readily understood by one of ordinary skill in the art that the DC offset restoration and clamping functionality of the previously described components of FIG. 4 are provided merely to process the incoming composite video signal before being further digitized by comparator U1, the rest of the circuit, and any decoder which decodes the pulses produced by the circuit of FIG. 4. Thus, the present invention may be implemented in alternative embodiments without this initial pre-processing, or with different pre-processing functionality, albeit with a possibility of poorer performance.

In a further embodiment of the present invention, additional circuitry may be utilized in conjunction with the digitizer of FIG. 4. Specifically, in order to improve the quality of a video signal provided on line 201 of the digitizer, an automatic gain control (AGC) circuit and/or a phase-locked loop (PLL) circuit may be provided so as to further condition the signal processed by the digitizer. For example, this circuitry may be provided at a point before the processed signal is provided to comparator U1, etc.

The video signal which has been processed by resistors R1 and R3, capacitor C1, and diodes CR1 and CR3, is thereafter supplied to the input of comparator U1 at pin 2. In step 502 of FIG. 5, comparator U1 compares the voltage at pins 2 and 3, and based upon this comparison provides a digital TTL output at pin 6. Given that pin 2 corresponds to the "−" terminal, and pin 3 corresponds to the "+" terminal, if the voltage signal at pin 2 is less than the voltage level at pin 3, the output voltage at pin 6 goes high (at or near +5 V), whereas, if the voltage signal at pin 2 is greater than the voltage level at pin 3, the output voltage at pin 6 goes low (at or near ground).

The voltage at the "+" terminal (pin 3) of comparator U1 may be set by means of variable resistor R4. Specifically, resistors R2 and R4 act as a voltage divider, with the reference voltage at pin 3 being set between +5 volts and ground. In a preferred operating environment, variable resistor R4 may be set to a resistance of approximately 2 kΩ, so that the reference voltage at pin 3 of comparator U1 will be set to approximately 2.16 V, which effectively strips all synchronization pulses from the signal. Referring back to FIG. 3, the reference voltage at pin 3 in a preferred embodiment is shown as reference numeral 320.

The particular reference voltage supplied to pin 3 by resistors R2 and R4 may normally be determined through experimentation. The voltage at pin 3 is chosen such that the digitizer of the present invention most accurately digitizes the composite video data.

In practice, the optimum reference voltage for pin 3 has been found to be at a point approximately 50% into the signal. That is, the voltage of pin 3 may be chosen such to be at a level which is half-way between the minimum and maximum voltage levels of the video portion of the incoming signal. The particular resistive values for resistors R2 and R4 in the preferred embodiment were chosen according to this approach.

The reference voltage at pin 3 of comparator U1 is chosen such that, when the processed composite video signal is supplied to pin 2 of comparator U1, the output of comparator U1 will go low when the voltage level of the video signal goes above the reference voltage at pin 3, and the output of comparator U1 will go high when the voltage level of the video signal goes below the reference voltage at pin 3. This configuration is employed due to the way in which a bar code which is present within one or more horizontal video data lines is encoded.

Figure 6:
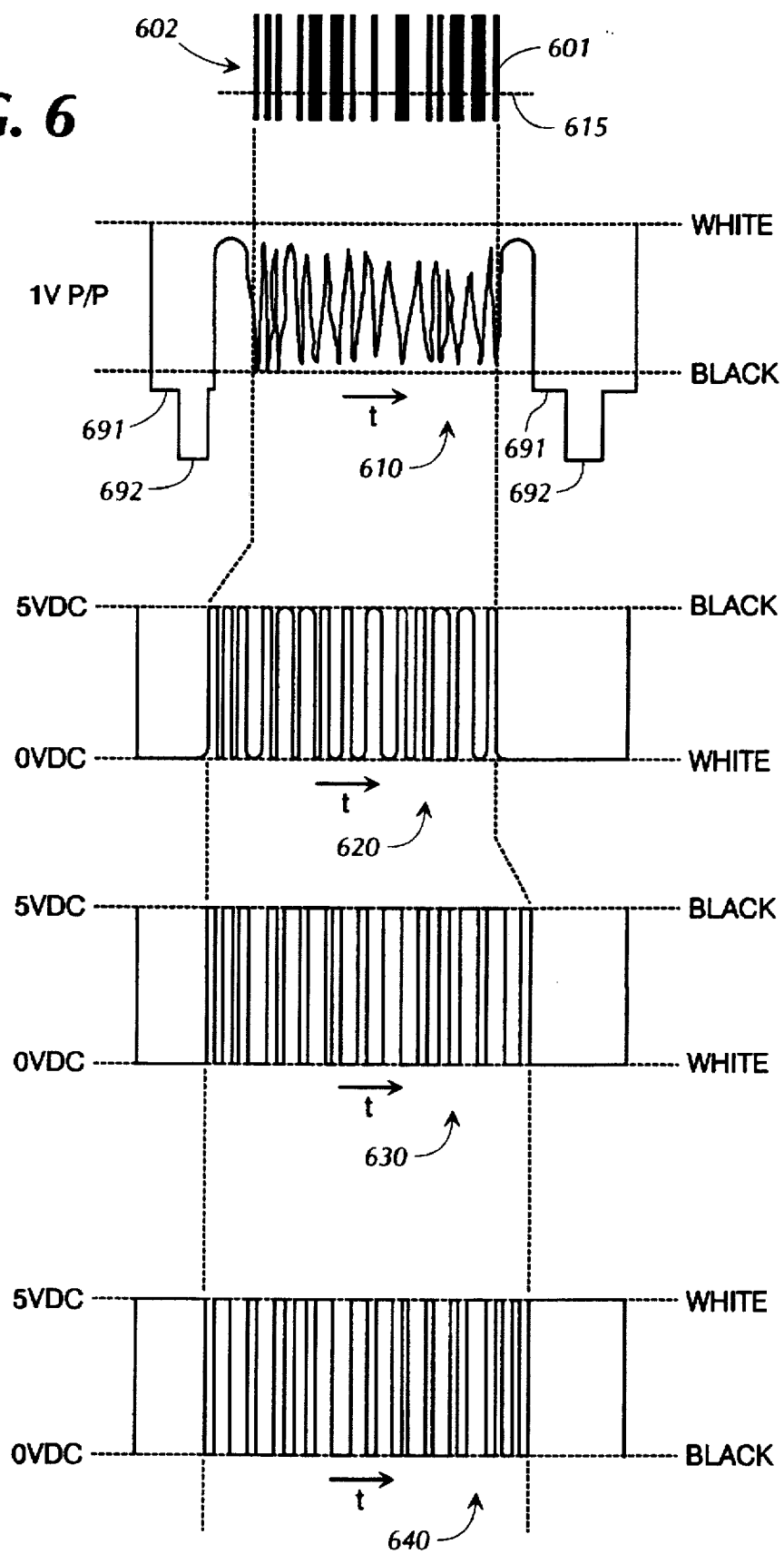
FIG. 6 depicts a sample bar code as visually represented within a composite video signal, as well as the corresponding video data as encoded within one horizontal line of the composite video signal.

Specifically, FIG. 6 discloses a sample bar code 601 which might be visually represented in a video frame 602 within a composite video signal transmitted into the digitizer of FIG. 4 via line 201. As previously discussed, this particular visual image of a bar code may be provided from a video camera, or any other video source. It is important to understand that the present invention will operate with any composite video image of sufficient resolution, and is not limited by the actual size of the physical bar code which might be the original source of the video image. For example, the present invention will work equally well with a video image of a bar code placed on the surface of the earth's moon (as seen through a video telescope), as with a video image of a bar code placed on the back of an amoeba (as seen through a video microscope).

Referring again to FIG. 6, a voltage waveform representing (over time "t") the voltage levels within a horizontal line of the composite video signal is depicted as reference numeral 610. In the present case, waveform 610 represents the voltage level of the video data within the composite video signal corresponding to horizontal line 615 which intersects all of the bars of the bar code.

As can be seen from waveform 610, the voltage level of the composite video signal is at a relatively low level when representing a black bar of the bar code, while it is at a relatively high level when representing the white space between the black bars. This scheme corresponds to the normal scheme which is employed in conventional composite video signals, wherein images having a higher luminance (e.g., "White") result in a higher voltage in the video signal (that is, a voltage father away from the blanking pulses 691 and synchronization pulses 692), and wherein images having a lower luminance (e.g., "Black") result in a lower voltage in the video signal (that is, a voltage closer to the blanking pulses 691 and synchronization pulses 692).

According to the coding scheme for many bar code decoders, such as bar code decoder 203 of FIG. 2, each bar in a bar code is expected to be encoded as a high voltage level, and each white space between bars is expected to be encoded as a low voltage level (other types of bar code decoders have the opposite convention, and still others will accept either convention). Therefore, because the black bars of a bar code will be encoded within a composite video signal as a relatively low voltage, while the white spaces will be encoded as a relatively high voltage, the video signal fed into comparator U1 is fed into pin 2, which is the "–" terminal. In this way, when the voltage level of the video signal input into pin 2 of comparator U1 reaches a relatively high level (corresponding to a white space), this high voltage level will presumably be higher than the reference voltage level at pin 3 of comparator U1, resulting in a low voltage output out of comparator U1. If, on the other hand, the voltage level of the video signal input into pin 2 of comparator U1 reaches a relatively low level (corresponding to a bar), this low voltage level will presumably be lower than the reference voltage level at pin 3 of comparator U1, resulting in a high voltage level out of comparator U1. Thus, the bar code embedded within a horizontal line of the video signal will cause a digitized counterpart to be provided at the output of comparator U1 (pin 6).

The voltage levels supplied to decoder 203 by, for example, the output of comparator U1 may be decoded by decoder 203. Decoder 203 interprets the changes/transitions between high and low voltage levels to represent the change from a bar to a space, or vice versa. The duration of highs and low voltages are used by the decoder to determine the data which the bar code represents.

Inverter U2A receives the output of comparator U1, and thereby provides an inverse of the output of comparator U1 at the output of inverter U2A (e.g., at pin 3 of inverter U2A). Inverter U2B in turn receives the output of inverter U2A, and inverts the digital signal once again so as to provide an output at pin 6 of inverter U2B which corresponds to the output of comparator U1. Buffer U3A receives the output of inverter U2B, and provides a buffered output on line 402, while buffer U3B receives the output of inverter U2A, and provides a buffered output on line 403.

A sample waveform provided at the output of comparator U1 corresponding to bar code 601 is shown as reference numeral 620. As can be seen, waveform 620, while comprising a relatively clean digital signal, is still not completely square, which is an ideal condition for a digital signal. Therefore, although the output of comparator U1 is provided in a relatively clean TTL format (which might or might not be suitable for supplying to a decoder), inverters (e.g., NAND gates) U2A and U2B are additionally provided in order to further clean up the output of comparator U1. Specifically, both inverters U2A and U2B serve to further provide square digital transitions from a low voltage level to a high voltage level, and vice versa. In this way, any slewing which might occur at the output of comparator U1 is cleaned up. The digital conditioning function of inverters U2A and U2B is shown in the flow diagram of FIG. 5 as step 503.

The output lines 402 and/or 403 of buffers U3A and U3B may be fed into a high-speed decoder for decoding the digitized bar code signals. The sample waveforms at lines 402 and 403 (corresponding to bar code 601, composite video signal 610 and waveform 620) are depicted as reference numerals 630 and 640, respectively. As can be seen from waveforms 630 and 640, output lines 402 and 403 provide complementary versions of the digitized signals because different types of decoders have different requirements. Complementary versions of the output digital signal are provided via lines 402 and 403 because some decoders require a "positive going" signal, where the bars of a bar code are represented as a high voltage level, and the white spaces between the bars are represented as a low voltage level. Other decoders require a "negative going" signal, where the digital representations are reversed.

Figure 8:
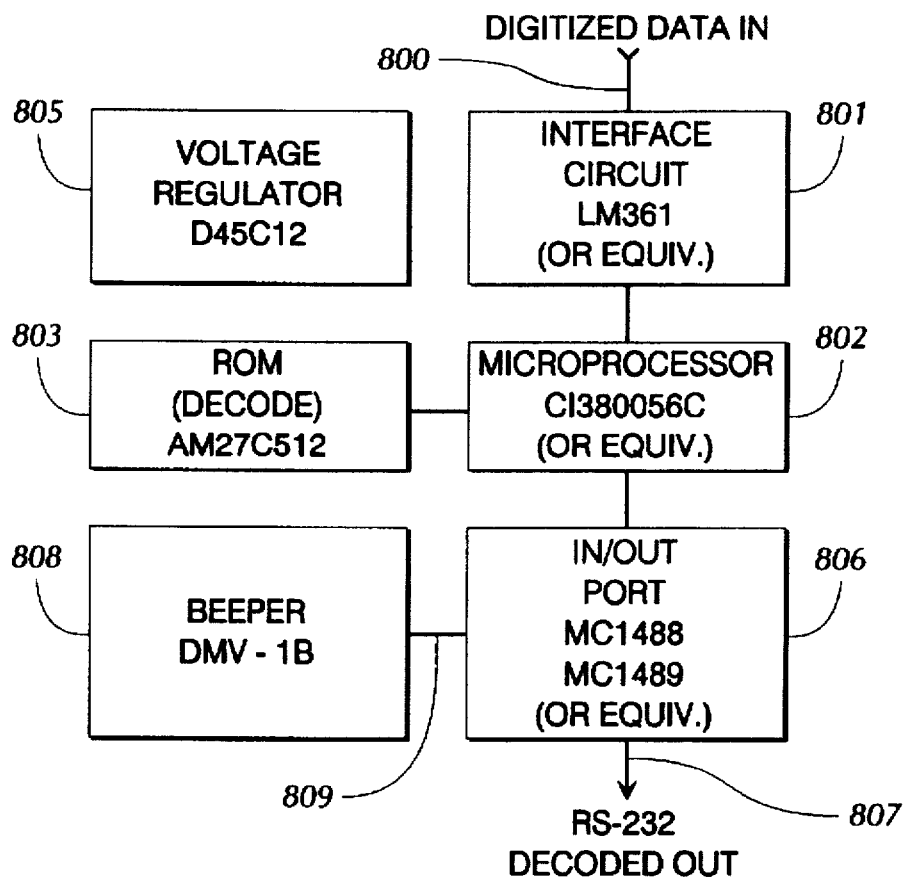
FIG. 8 depicts a block diagram of a bar code decoder suitable for use with the digitizer of FIG. 4.

A high-speed decoder 203 which may be used to decode the output (either line 402, line 403, or both) of the digitizer of FIG. 4 is shown in FIG. 8, and may be implemented by using high-speed operational amplifiers as an interface circuit 801 to drive the input of a microprocessor 802 coupled to an EPROM (erasable/programmable read-only memory) decoder 803 designed to decode bar code information. Particularly, the output of the digitizer of FIG. 4 may be provided to line 800 of the high-speed decoder. For purposes of the preferred embodiment, decoder 203 (as shown as the overall circuit of FIG. 8) must be able to decode signals with 200 nsec pulse width.

For example, a high-speed decoder model number LD1020 available from B&R Electronics of Peachtree City, Ga. may be utilized as the high-speed decoder, as shown in FIG. 8. In this high-speed decoder, interface circuit 801 may comprise LM361 operation amplifiers (or equivalent) available from National Semiconductor, and microprocessor 802 may comprise a C1380056C (or equivalent) microprocessor available from Intel.

One of ordinary skill in the art will recognize that microprocessor 802 may be readily programmed via the EPROM 803 so as to provide the digitized data provided by interface circuit 801 to I/O port 806.

Voltage regulator 805 (such as part number D45C12 available from Syntest) is provided so as to regulate the voltage provided via appropriate connections (not shown) to the components of the high-speed decoder in FIG. 8. The high-speed decoder in FIG. 8 also includes I/O port 806, which may be used to interface the high-speed decoder of FIG. 8 to, for example, a computer, via line 807. For example, I/O port 806 may comprise a MC1488 and/or MC1489 I/O device available from Motorola, and line 807 may be implemented as an RS-232 interface connection.

In addition to line 807, a beeper 808 (which may comprise part number DMV-1B available from B&R Electronics) may be connected to the I/O ports 806 via line 809 so as to provide an audible indication that a bar code was detected and decoded. Of course, any other kind of indication may be provided as well in order to demonstrate to the user of the decoder that a bar code was detected and decoded.

Decoder 203 may be designed to decode one or more of the popular bar code methodologies currently in use, such as: UPC/EAN, Codabar, Interleaved 2 of 5, Code 39, Code 128, or any other coding methodology which may be developed.

As shown in FIG. 2, the output of such a decoder 203 may be in a standard RS-232 format, or other suitable format, for interfacing via a communication link 204 to a computer, or other processing device.

In addition to a high-speed decoder, the digitizer depicted in FIG. 4 may be connected to a video monitor, or other video device, via line 404. Capacitor C2, resistors R5, R6 and R7, and transistor Q1 serve as a voltage follower circuit so that the voltage at line 404 follows the voltage at line 201. This voltage follower also serves to isolate the device connected to line 404 from the video input at line 201, and prevents any impedance matching problems from occurring.

In general, the present invention will operate to digitize a bar code if the entire bar code is represented within at least one horizontal line of the video frame. Thus, if the bar code is rotated a certain angular distance, the present invention will still digitize the complete bar code if any one of the horizontal lines passes through all of the bar code elements.

For a bar code within a composite video signal which is rotated so that no horizontal line contains the complete bar code, further processing routines may be utilized for purposes of implementing the present invention. For example, before being fed into line 201, the composite video signal may be repeatedly rotated to differing angles, so that at some point each bar code within the video frame will be approximately within the horizontal line of sight. Other analogous processing may also be performed on the composite signal for this purpose.

The digitizer and high-speed decoder combination of the present invention may readily be used to convert multiple bar codes within the video signal. Because a composite video signal comprises numerous horizontal lines within a video frame, and each of these horizontal lines can contain numerous complete bar codes, the present invention may be used to digitize and/or decode all such bar codes within the video signal.

Figure 7:
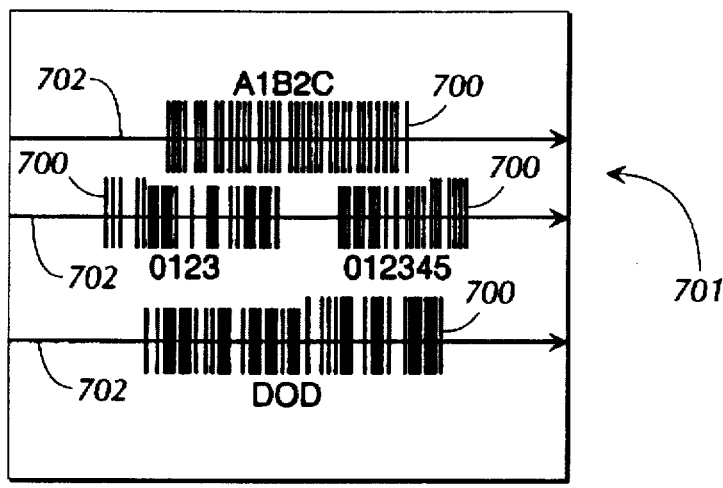
FIG. 7 depicts multiple sample bar codes visually represented within a composite video signal.

For example, referring to FIG. 7, multiple bar codes 700 are visually represented within the video frame 701 of a composite video signal. Selected horizontal lines 702 are also depicted in FIG. 7. As each horizontal line is sequentially transmitted within the composite video signal and fed into line 201, the digitizer of FIG. 4 will digitize any bar codes contained therein, and will provide the results to decoder 203. Thus, in the case of multiple bar codes as shown in FIG. 7, multiple digitized complete bar code signals will be provided by the digitizer of FIG. 4 to decoder 203. Of course, as decoder 203 sends the resulting data extracted from the bar codes to, for example, a computer via line 204, the computer may further process the incoming data so as to utilize the data from the multiple bar codes accordingly.

It has been demonstrated that the present invention in a preferred embodiment may be used to decode one or more bar codes within a composite video signal provided that the underlying video image of the bar code(s) is in focus, and the tilt of the bar code(s) are less than or equal to the maximum allowable degree of tilt. The maximum allowable degree of tilt for a particular bar code may be determined with the following equation:

$$\text{max. degree of tilt} = \text{inverse tangent} \times \text{height of bar code/width of bar code}$$

Each bar code must also cover at least approximately 25 percent of the horizontal viewing plane, and can't exceed approximately 95 percent of the horizontal viewing plane.

As is evident from the above-described description, the teachings of the present invention may be applied to numerous environments. While it is impossible to describe every possible use for the present invention, several specific uses for the base technology have been developed, as described below. It will be readily understood that the below-described applications of the present invention merely illustrate a few of the broad range of uses for which the present invention may be put—other equivalent and analogous uses will be apparent.

Figure 9:
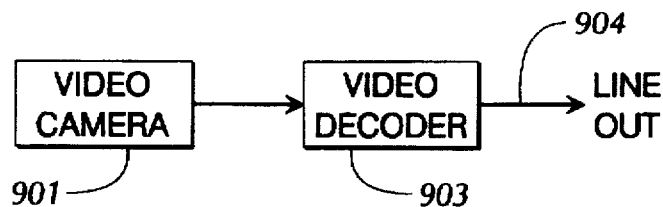
FIG. 9 depicts a block diagram of a system for decoding bar codes within a video signal generated by a video camera.

As described previously with respect to FIG. 2, the present invention may be implemented to decode, for example, a bar code in a standard composite video signal. FIG. 9 illustrates, in one embodiment, the block diagram of FIG. 2, showing a video camera 901 as a video source, and combining the digitizer 202 and decoder 203 into video decoder 903. As with line out 204, line out 904 may serve to interface the decoder 903 to, for example, a computer, for further processing of the decoded signals.

In the embodiment of FIG. 9, video camera 901 captures a video image, converts this image into a composite video signal, supplies the composite video signal to decoder 903, which decodes any bar codes within the video signal, and the output is supplied to, for example, a computer, via line 904. Of course, any other video signal source could be substituted for video camera 901, such as a composite video signal from a video cassette recorder (VCR), a television video signal transmission, etc.

Figure 10A:
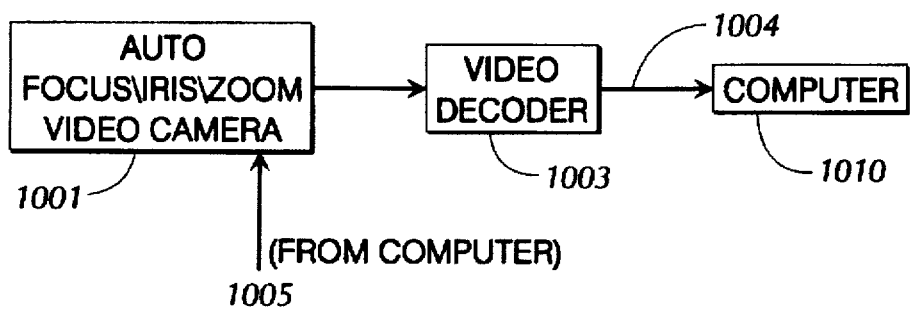
FIGS. 10(a) and 10(b) depict a block diagram and a perspective view of a video bar code decoder including a camera having auto focus, auto iris and auto zoom capabilities.
Figure 10B:
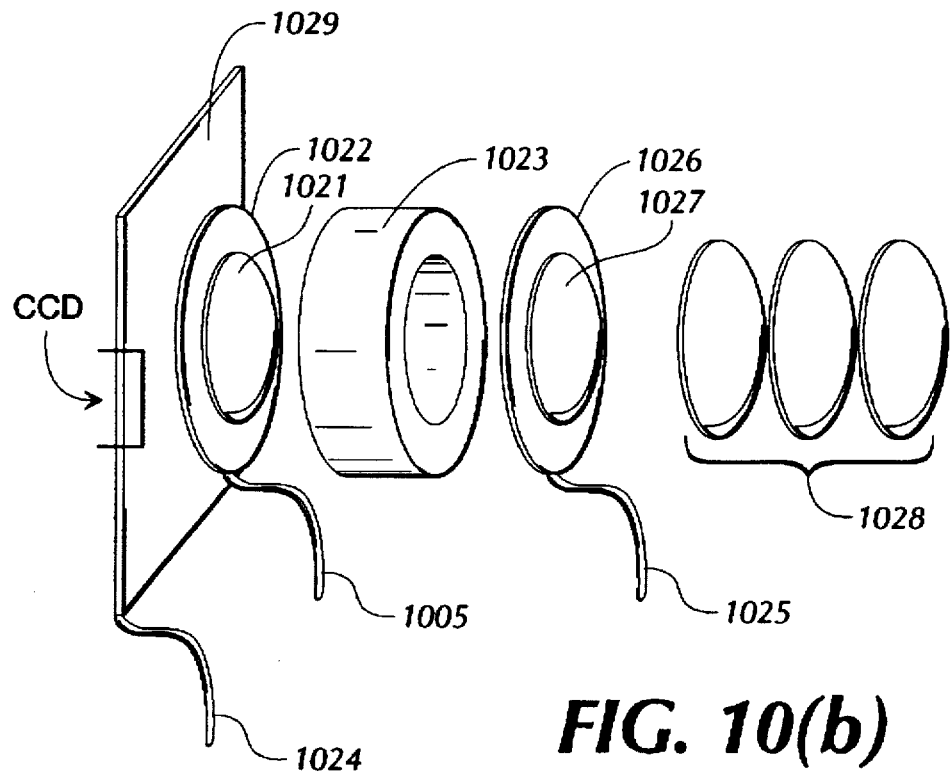

FIGS. 10(a) and 10(b) depict a further embodiment of the present invention. Particularly, FIG. 10(a) illustrates the arrangement of FIGS. 2 and/or 9 utilizing a video camera 1001 having, for example, auto-focus, auto-iris and auto-zoom capabilities. The remaining components of FIG. 10(a) correspond to like components of FIGS. 2 and 9. That is, decoder 1003 corresponds to decoder 903 in FIG. 9, and to digitizer 202 and decoder 203 in FIG. 2; and line 1004 corresponds to line 204 of FIG. 2 and line 1004 of FIG. 4. Additionally, computer 1010 is provided to receive the input from line 1004. Although a computer is not specifically shown in FIGS. 2 and 9, it may be present in these embodiments to receive the inputs from lines 204 and 904, respectively.

The video camera 1001 of FIG. 10(a) may, in a preferred embodiment, comprise an off-the-shelf product. For example, camera 1001 in one embodiment may comprise model number 4910 available from Cohu, or an equivalent. The video camera 1001 depicted in FIG. 10(a) is designed so that the focal point of the lens of the video camera 1001 is able to be controlled by, for example, a computer via line 1005, as further depicted in FIG. 10(b).

FIG. 10(b) shows another embodiment of a lens system having auto-focus, auto-iris and auto-zoom capabilities, as further described below. The lens system of FIG. 10(b) couples to the remainder of the video camera in close proximity to the CCD device. The CCD forms the portion of the camera upon which light is directed in order to form the video frame image. The lens system may include a lens 1021 mounted on a lens diaphragm 1022, where the axial movement of the diaphragm 1022 may be computer controlled (via line 1005). The diaphragm may, for example, comprise an electromagnetic coil which interacts with magnet 1023 in order to move diaphragm 1022 away from or toward magnet 1023. Such auto-focus mechanisms are commonly known in the art.

The computer controlling the lens 1021 and lens diaphragm 1022 may be the same computer 1010 which receives decoded signals via line 1004, or may be a separate computer. In any event, the computer controlling the lens of video camera 1001 may operate so as to establish a focal point of the lens in a desired manner, as described below.

Specifically, the computer of FIG. 10(a) which controls the lens via line 1005 may operate to control the focal point of the lens 1021 so as to focus the lens on a object a specific distance away from the lens system, which may include a visible bar code on its surface. For example, modern camera techniques in consumer hand-held cameras (such as those made by Minolta), use ultrasonics to determine the distance to relatively large, easily discernable, objects. In the present application, such a system would work if the bar code was printed on the surface of the object. That is, a lens system which focuses on the surface of an object would also be focused on a bar code printed on the same surface. However, if numerous objects are within the field of view of the lens, or the lens is otherwise unable to focus on the bar code, other approaches to focusing the lens may also be utilized.

For example, another approach would be to oscillate the lens diaphragm 1022 of the lens system throughout its range so as to scan through all possible focal points. As the focal point reaches the proximity of a bar code, the bar code will be in focus within the video frame of the video camera 1001, and the decoder 1003 will be able to discern the bar code, decode the same, and provide the results to computer 1010.

In order for a computer, or other controlling means, to control the lens 1021 of the video camera 1001 through lines 1005, so as to scan through all available focal points to find a suitable focal point, the computer may perform an incremental scanning function until a certain amount of voltage level pulses within the video signal are detected. That is, if the lens 1021 is out of focus relative to the bar code (e.g., the focal point is not in the proximity of the bar code), a blurred image will be present in the video frame, and relatively few transitions from high to low or low to high in the voltage levels of a horizontal line will be present. In order to determine when the lens 1021 should be directed to stop scanning through focal points, the number of times that the voltage in a single horizontal line rises above a certain level (e.g., 2.5 volts) may be counted. Once a certain count is reached, the lens 1021 may be directed to stop scanning. Thus, whether an ultrasonic auto-focus methodology is utilized, or whether a count is maintained of the number of times that the voltage rises above a certain level, the distance from the lens 1021 of the video camera 1001 to the bar code may be determined. This information may, of course, be passed back to the computer via line 1005 for further processing.

In addition to adjusting the focus of the lens 1021 of video camera 1001, the iris of the lens system of FIG. 10(b) may also be controlled according to an embodiment of the present invention. Particularly, as discussed above, off-the-shelf lens systems are available which may mechanically control the iris of a lens system. In addition to these conventional auto-iris systems, a relatively quick method for adjusting the iris in a lens system may be implemented utilizing a liquid crystal display (LCD) window 1029. Generally speaking, LCD window 1029 comprises a normally relatively clear window having an electrically connected liquid crystal substance sandwiched therein which becomes cloudy when a voltage potential is applied across lines 1024. By adjusting the voltage across lines 1024, relative levels of cloudiness may be obtained through the LCD window 1029, and differing levels of light may therefore pass through the window 1029. Thus, a solid-state iris effect is achieved.

In a further embodiment, the lens system shown in FIG. 10(b) may include zoom lens capabilities to work in conjunction with auto-focus and auto-iris capabilities. The zooming feature of such a lens may be implemented with another lens 1027 attached to a lens diaphragm 1026, which is positioned relative to magnet 1023. A computer may control the lens diaphragm 1026 via line 1025 in a manner similar to the auto-focus capabilities, such as by scanning through the available zoom range.

Reference numeral 1028 depicts the remainder of the lens system of FIG. 10(b), which may include other lens-related components.

Given the variable settings of the three controllable features (focus, iris and zoom) of the lens system of FIG. 10(b), a possibility exists that the proper settings of the features may not be able to be made in a short enough duration of time so as to distinguish, for example, a moving bar code within the field of vision. However, if the range of adjustment of the focus, iris and zoom of the lens is kept to a minimum, then this should be no problem.

In a further embodiment, the lens system of camera 901 may comprise a telecentric gaging lens, such as part number 59LGA499, available from Melles Griot. Such a lens, while relatively expensive, has a large depth of focus, and may be used when small bar codes need to be detected and decoded by the video bar code system of the present invention.

Bar codes having less than a 7 mil x-dimension (width of the smallest bar in the bar code) may require a very limited depth of focus. For example, a 2-mil x-dimension bar code will generally have a 0.250 depth of focus. In this situation, the video decoder normally requires that such a bar code be at or very close to the focal point of its image. Using a telecentric gaging lens, a greater depth of field can be achieved (such as up to several inches), resulting in a greater likelihood that the bar code can be detected and decoded.

Other types of lenses may, of course, also be used as the lens for camera 901, in order to achieve certain results. For example, a "dove lens", such as those manufactured by Melles Griot, may be used in order to rotate the image within the video frame. Such a lens may be useful in order to read bar codes within the field of view which are at varying angles relative to horizontal. Accordingly, using such a lens may have a negative impact on the read rate for the bar codes within the field of view, as the bar codes will not necessarily be decodable at every point during the rotation of the image.

Another application of the base technology of the present invention is described below. Using multiple video cameras which are multiplexed together, an omnidirectional reading of bar codes may be made. For example, a bar code whose height and width are substantially equal may be read omni-directionally with the use of two camera mounted in such a way as to make the horizontal field of view on each camera perpendicular to each other. Thus, regardless of the orientation of the bar code, either one (or both) cameras would be able to read the bar code. More than two camera may also be used in order to increase the chances of successfully reading the bar code (if, for example, the bar codes dimensions were unequal, etc.). In one embodiment, four camera may be mounted at different locations and/or angles to accomplish such functionality.

Figure 11A:
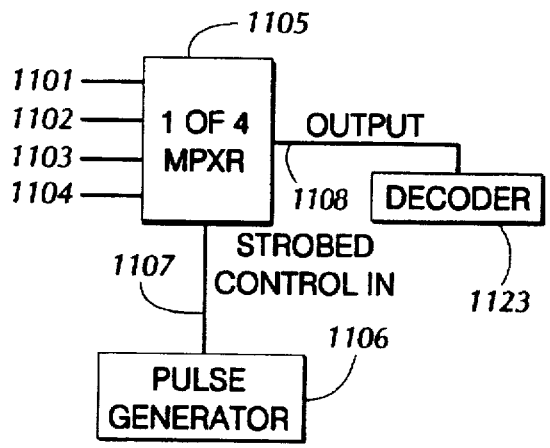

In order to decode the output of more than one video cameras, a multiplexing circuit may be utilized. FIGS. 11(a) and 11(b) depict two sample arrangements for multiplexing the video signal output of, for example, four cameras to, for example, a decoder (decoder 1123 or decoder 1133) for further processing.

Figure 11A:
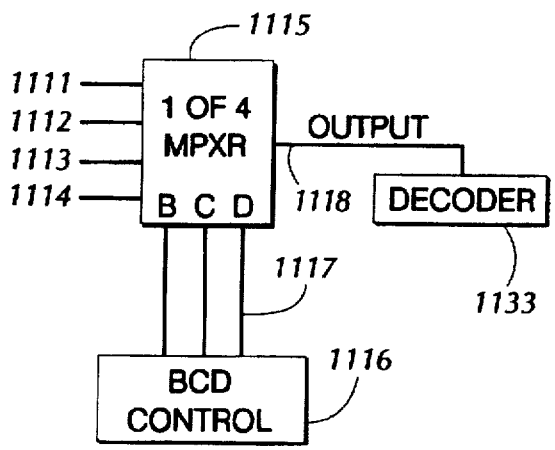

In FIG. 11(a), a multiplexer 1105 is provided which receives as input the video signal from four video cameras via lines 1101, 1102, 1103 and 1104, respectively. Of course, more or less than four video camera can be utilized, and the four camera inputs shown in FIG. 11 are merely used for illustrative purposes.

A pulse generator 1106 is coupled to the multiplexer 1105 via line 1107. The pulse generator 1106 provides strobed voltage pulses to multiplexer 1105, which responds to the pulses by sequentially cycling through each video signal input line. That is, as pulse generator 1106 provides a pulse to multiplexer 1105, the next one of the four video signals provided to multiplexer 1105 via lines 1101, 1102, 1103 and 1104 is coupled to output line 1108. For example, if the video signal provided on line 1101 is currently being coupled to output line 1108, and a pulse is provided to multiplexer 1105 via line 1107, then the video signal provided on line 1101 is no longer coupled to line 1108, but instead the video signal provided on line 1102 is next coupled to output line 1108. This type of sequence continues every time a pulse is provided by pulse generator 1106, and each of lines 1101, 1102, 1103 and 1104 is individually coupled to line 1108 in a cyclic sequential manner.

An alternative to the multiplexing arrangement of FIG. 11(a) is provided in FIG. 11(b). In FIG. 11(b), instead of sequentially cycling through the four input lines, multiplexer 1115 couples one of input lines 1111, 1112, 1113 or 1114 to the output line 1118 based upon a binary coded decimal (BCD) digital signal received from BCD control 1116, via digital lines 1117. Therefore, instead of sequentially cycling through the available input lines, as in the system of FIG. 11(a), a particular input line may be absolutely chosen by BCD control 1116. For example, if line 1113 is to be coupled to output line 1118, then BCD control 1116 may provide a suitable BCD digital representation of this line (e.g., binary code 3) to multiplexer 1115, which would then couple line 1113 to output line 1118. A suitable number of digital lines 1117 may be used so that any number of input lines may be accessed. In one embodiment, the following equation may be used in order to determine how many digital lines 1117 are necessary:

$$L=2^N$$

where "L" equals the number of input lines 1111, 1112, etc., and "N" equals the number of digital control lines 1117. Thus, if eight input lines are to be used, then three digital lines 1117 would be necessary.

In a preferred embodiment, multiplexers 1105 and 1115 may be implemented using suitable logic components. For example, multiplexer 1105 may comprise product number M74HC4066 available from SGS-Thomson, while multiplexer 1115 may comprise product number HA2444 available from Harris. Similarly, pulse generator 1106 may comprise LM555 available from Motorola. BCD control 1116 may be implemented using a standard computer control system. Suitable equivalents of these components may also be used.

Figure 12:
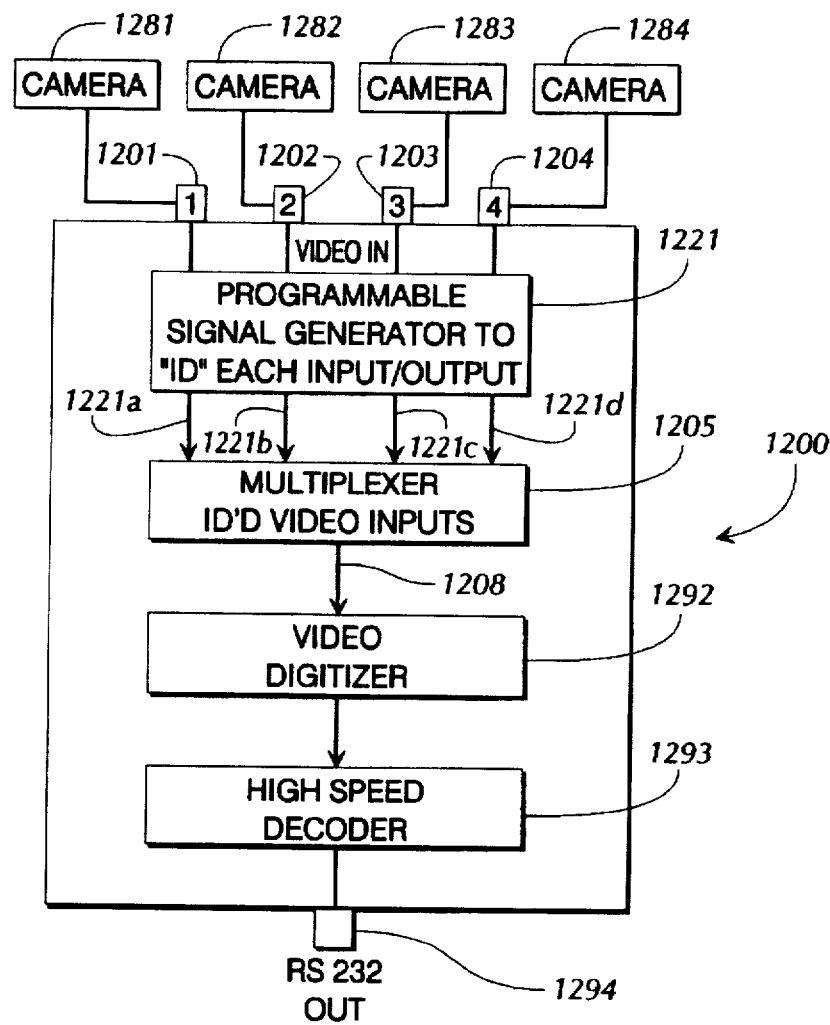
FIG. 12 depicts a block diagram of a video multiplexer for multiplexing one of a plurality of video input lines into an output line, and for appending an identification code thereto.

Another feature which may be added to the multiplexing circuitry of FIGS. 11(a) and 11(b) is the ability to send a signal to decoder 1123 or 1133 via lines 1108 or 1118, respectively, in order to indicate from which camera the particular video signal came from. FIG. 12 shows a block diagram depicting a video multiplexer suitable for accomplishing this purpose.

Referring to FIG. 12, a video multiplexer 1200 is shown broken down into further functional components. Input lines 1201, 1202, 1203 and 1204 are provided, which correspond to equivalent input lines 1101, 1102, 1103 and 1104, as well as 1111, 1112, 1113 and 1114 of FIGS. 11(a) and 11(b), respectively. Of course, a lesser or greater number of input lines may be used—four input lines are illustrated in FIG. 12 merely as illustrating one embodiment of the present invention.

Input lines 1201, 1202, 1203 and 1204 are coupled to a programmable signal generator 1221. Programmable signal generator 1221 produces a bar code identification (tag) signal on lines 1221a, 1221b, 1221c and 1221d as a prefix or suffix to the video input signal provided on the corresponding input lines. That is, programmable signal generator 1221 may produce a signal sequence on line 1221a corresponding to a bar code which represents a code unique to line 1201. Similarly, programmable signal generator 1221 may produce bar code signals on lines 1221b, 1221c and 1221d which represent a code unique to each of the corresponding input lines 1202, 1203 and 1204, respectively. Thus, programmable signal generator 1221 may produce on each of lines 1221a, 1221b, 1221c and 1221d a signal in bar code format representing a code unique to that particular line. The signal is transmitted either before (prefix) or after (suffix) the video signal provided on lines 1201, 1202, 1203 and 1204. Therefore, the signals produced by programmable signal generator 1221 are interspersed with the signals passed through from 1201, 1202, 1203 and 1204 to 1221a, 1221b, 1221c and 1221d, respectively. A suitable programmable signal generator is part number BU28015 available from Rohm. However, suitable equivalent a programmable signal generator may be used.

Multiplexer 1205, which corresponds to multiplexers 1105 and 1115 in FIGS. 11(a) and 11(b), takes as inputs the signals on lines 1221a, 1221b, 1221c and 1221d. One of these lines is coupled to output line 1208 (as controlled by a pulse generator, such as pulse generator 1106, or a BCD control, such as BCD control 1116, or an equivalent control mechanism). Thus, one of lines 1201, 1202, 1203 or 1204 is coupled through to video digitizer 1292, with a signal in bar code format appended as either a prefix or suffix by programmable signal generator 1221.

Video digitizer 1292 and high speed decoder 1293 operate in a manner similar to video digitizer 202 and decoder 203 in FIG. 2 (and decoder 903 in FIG. 9), and the output of high speed decoder 1293 may be provided via line 1294 (such as an RS-232 line) to, for example, a computer for further processing.

In operation, the video multiplexer 1200 of FIG. 12 may be used to decode bar code data in video signal from, for example, cameras 1281, 1282, 1283 and 1284 (or equivalent video signal generators) placed in different locations. Not only may the bar code data be decoded, but the particular camera from which the bar code has been decoded may be isolated to identify from which video source bar code data has been identified.

Video multiplexer 1200 may be used with either a pulse generator (such as pulse generator 1106 in FIG. 11(a)) or a BCD control (such as BCD control 1116 in FIG. 11(b)), or equivalent control circuitry, to couple one of the input lines 1201, 1202, 1203 or 1204 to output line 1208. As with the video decoders depicted in FIGS. 2, output line 1208 may be connected to a digitizer 1292, which in turn is connected to a high speed decoder 1293. Both digitizer 1292 and decoder 1293 correspond functionally to the decoder block 903 of FIG. 9. As discussed above, the output of decoder 1293 may be provided to, for example, an RS-232 output line 1294.

In order to use the video multiplexer of FIG. 12, a user may select an identification code for each input line 1201, 1202, 1203, 1204, etc. Each identification code may be unique to the particular input line, or two or more input lines can share the same code, depending upon the purpose for which the code will be put. For example, if two or more cameras are in the same general location (for example, in an omni-directional configuration), the input lines receiving the signals from these cameras may share the same identification code.

The programmable signal generator 1221 may thus be programmed so that each selected identification code is provided on the appropriate line 1221a, 1221b, 1221c and 1221d. In one embodiment, the programmable signal generator 1221 may provide the appropriate identification code on lines 1221a, 1221b, 1221c and 1221d in a bar code format, such as in a bar code format of the same symbology as the bar codes expected to be detected and decoded within the video frame of an incoming video signal. In this case, lines 1221a, 1221b, 1221c and 1221d would carry a signal composed of both the video signal from corresponding lines 1201, 1202, 1203 and 1204, as well as a bar code identification code identifying the particular line appended onto the video signal as either a prefix or suffix. The resulting signals provided to multiplexer 1205 (one of which thereafter being provided to video digitizer 1292, , decoder 1293, etc.) thus include both the original video signal (which may include embedded bar code data) as well as the bar code identification code. The identification code is treated by the decoder 1293 in the same way as a bar code within the video signal, and can be decoded and provided to a computer via line 1294 for further processing. The computer may the correlate the video signal to the appropriate input line and camera by processing the identification code and comparing it a stored list of identification codes.

Figure 13:
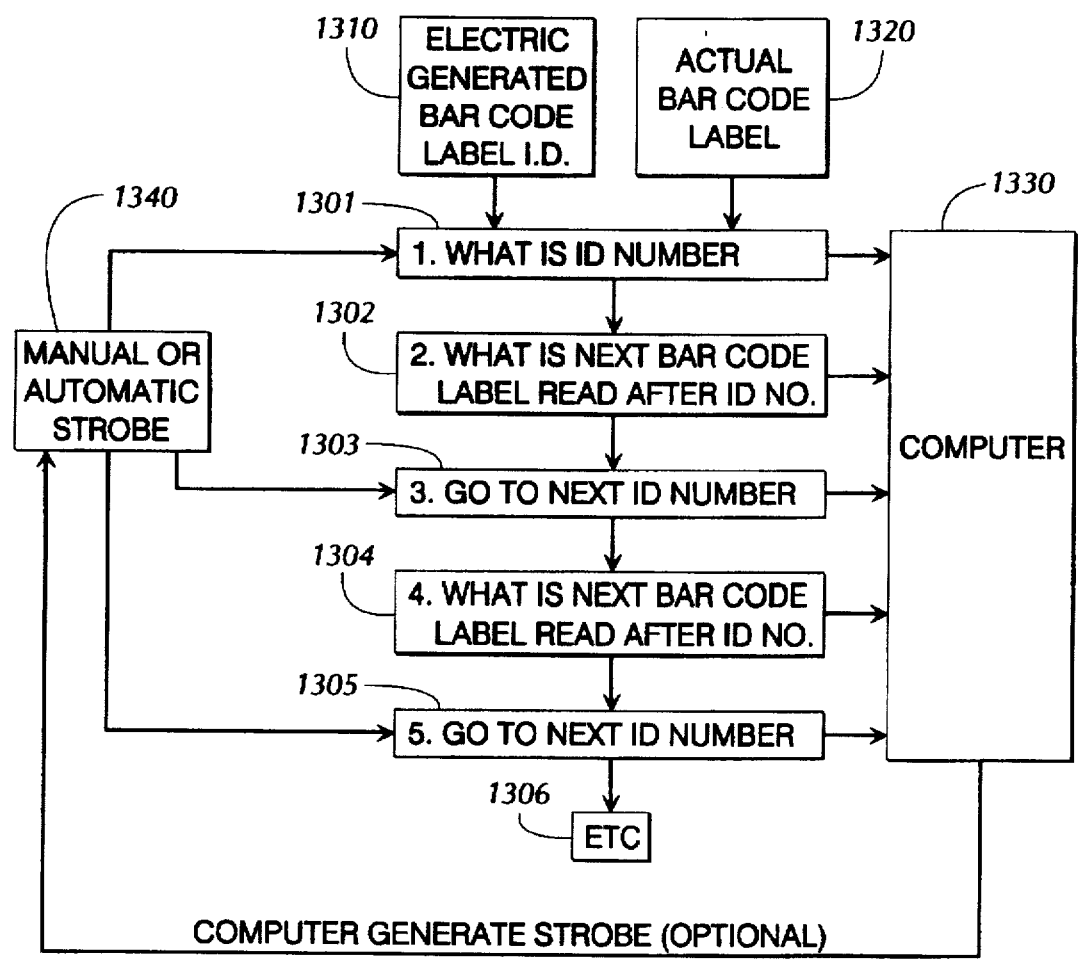
FIG. 13 depicts a block and flow diagram of a process for appending an identification code to a video signal.

FIG. 13 illustrates a combination flow diagram and functional block diagram which may be used to implement the video multiplexer of FIG. 12. Reference numerals 1301 through 1306 refer to a sequence of steps which may be performed in a preferred embodiment, while reference numerals 1310, 1320, 1330 and 1340 refer to functional structure which may be used to perform the different steps.

Referring to FIG. 13, a computer 1330 is shown which may control the overall processing of the video multiplexer of FIG. 12. A manual or automatic strobe mechanism 1340 may operate under control of computer 1330 in order to direct programmable signal generator 1221 (shown in FIG. 12) to append an identification code onto the video signals input from lines 1201, 1202, 1203 and 1204, and output at lines 1221a, 1221b, 1221c and 1221d. Reference numeral 1310 depicts the bar code identification code generated by programmable signal generator 1221 for a given line, and reference numeral 1320 depicts an actual video signal (with an embedded bar code) received on one of lines 1201, 1202, 1203 and/or 1204, and piped through to lines 1221a, 1221b, 1221c and/or 1221d, respectively. The operation of programmable signal generator 1221 will be described below with respect to one of the input and output line pairs (e.g., 1201 and 1221a, etc). It will be understood that this discussion is equally applicable to any of these input and output lines, whether there are four line pairs (as in the example of FIG. 12), or more or less lines.

First, at step 1301, if programmable signal generator 1221 is programmed to append the identification code for the particular line before the actual code, then computer 1330 activates strobe 1340 so as to cause programmable signal generator 1221 to output the identification code onto the appropriate output line (e.g., line 1221a). This identification code is multiplexed into video digitizer 1292 (by control circuitry 1106 or 1116, for example), decoded by 1293, and provided to computer 1330 via line 1294.

At step 1302, a bar code within the video signal of the same line may eventually be decoded by decoder 1293, and provided to computer 1330. Computer 1330 is able to equate the bar code with the preceding identification code, and determine from which camera and input line (e.g., 1201) the bar code came from.

At step 1303, the next bar code identification code is produced by programmable signal generator 1221, and is eventually provided to computer 1330, and the process repeats at step 1304, 1305, 1306, etc. Of course, if programmable signal generator 1221 is programmed to provide an identification code after the accompanying bar code is detected, computer 1330 may strobe the generator 1221 accordingly, via strobe 1340. Thus, the identification code may be produced under computer control, whether before or after a bar code is detected.

In another embodiment of the present invention, a color camera may be used for camera 901 of FIG. 9. Using a color camera, and bar code labels printed in, for example, the three primary colors (red, green and blue), the video decoder of the present invention may operate to differentiate between bar codes printed in these various colors, even if the bar codes are overlapping.

Figure 14:
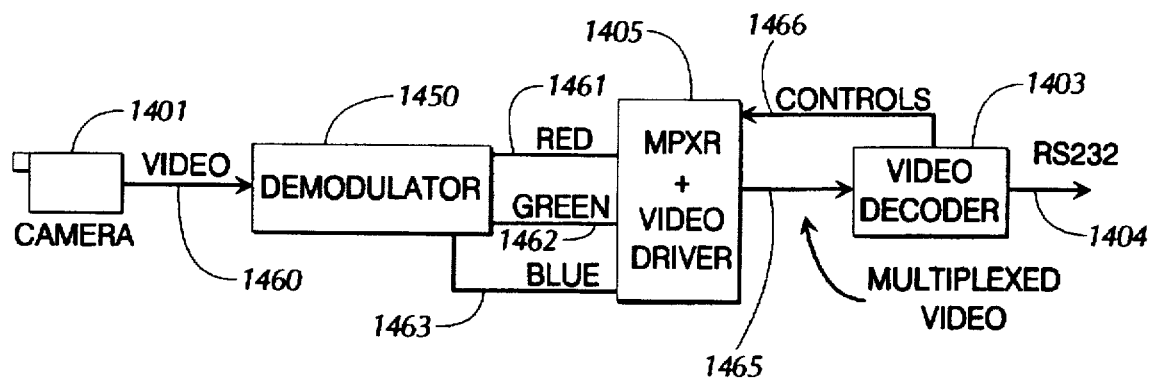
FIG. 14 depicts a block diagram of a video bar code decoder, where the three primary colors of a video signal are separated and decoded individually.

FIG. 14 discloses a functional block diagram of a video decoder capable of decoding bar codes within a video signal based upon the color of the bar code. Camera 1401 may comprise a color camera, such as 8290 available from Cohu, which produces a composite color video signal on line 1460. Demodulator 1450, which may comprise TDA3330 available from Motorola in one embodiment, demodulates the primary color attribute (red, green and blue) signals from the composite color video signal on line 1460, and provides the demodulated red, green and blue signals to line 1461, 1462 and 1463, respectively. Multiplexer and video driver (digitizer) 1405, which corresponds to, for example, the multiplexers of FIGS. 11(a) or 11(b), or multiplexer 1205 and digitizer 1202 in FIG. 12, multiplexes a selectable (by a computer, for example) one of lines 1461, 1462 or 1463 to line 1465, which is coupled to video decoder 1403 (corresponding to decoder 903 or decoder 1203 in FIGS. 9 or 12, respectively). The output of decoder 1403 may thereafter be provided via line 1404 to a computer for further processing.

Multiplexer and driver 1405 may operate in a manner similar to the multiplexers of FIGS. 11(a) and/or 11(b), or the multiplexer 1205 of FIG. 12, in that it may be controlled by a pulse generator 1106, BCD control 1116, etc. That is, multiplexer 1405 may be controlled by a computer so that each of input lines 1461, 1462 and 1463 is coupled in a cyclic and sequential manner to output line 1465, or a computer may drive multiplexer 1405 so that a particular one of lines 1461, 1462 or 1463 is coupled to output line 1465. This is a matter of design choice, subject only to the particular application requirements. Multiplexer 1405 may also be controlled by an EPROM in decoder 1403 via control lines 1466.

In addition to the demodulation of the three primary colors by demodulator 1450, bar codes of different colors may be discriminated by a video decoder of the present invention by using a color filter with camera 1401. Using a filter for a specific frequency of light may serve to enhance the camera's ability to discriminate between colors.

An important application of the detection and decoding of bar codes of different colors within a video signal, with or without filters, is the ability to handle overlapping bar codes of different colors. An example of overlapping bar codes within a video frame is shown in FIG. 15.

Figure 15:
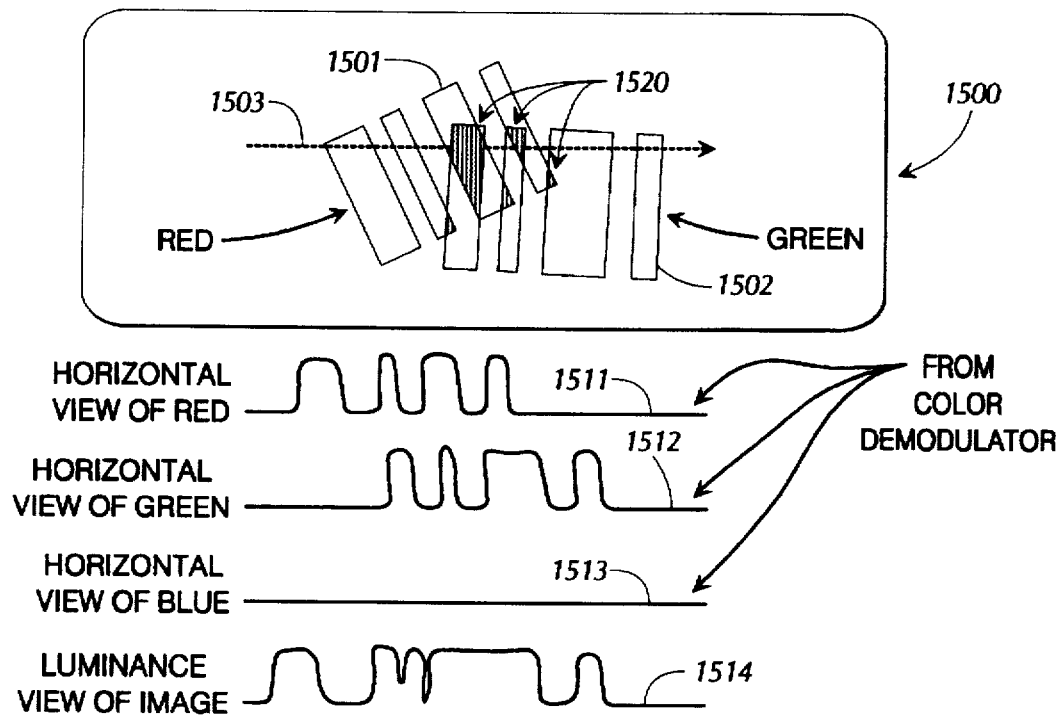
FIG. 15 depicts a frame of a video signal and corresponding waveforms for overlapping bar codes within the video frame.

FIG. 15 depicts a video frame 1500 within which two bar codes are represented. In this example, the first bar code, referred to by numeral 1501, is red in color (color not specifically shown), while the second bar code, referred to by numeral 1502, is green in color (color not specifically shown). The overlapping areas of these two bar codes are orange in color (depicted in the drawing as shaded area referred to as numeral 1520), because orange is an additive equivalent of overlapping red and green. A sample horizontal scan line, referred to by numeral 1503, is shown, which will be discussed in further detail below.

The video signal corresponding to horizontal lines 1503 may be fed into line 1460 of FIG. 14. Directly below the video frame 1500 of FIG. 15 are three waveforms 1511, 1512 and 1513, depicting the amplitude of the red, green and blue components of the horizontal line 1503, as provided by demodulator 1450 on lines 1461, 1462 and 1463, respectively.

First, waveform 1511, which is the red waveform at line 1461, includes pulses at locations along the horizontal line 1403 where the red bars are present. This includes locations where the green bars are also present, as the video signal at these locations include both a red and green component. Likewise, waveform 1512, which is the green waveform at line 1462, includes pulses at locations along the horizontal line 1403 where the green bars are present, regardless of whether red bars are also present. Because no blue bars are present in the sample video frame 1500, waveform 1513, which is the blue waveform at line 1463, includes no pulses.

The overall luminance of the video signal provided at line 1460 is shown as waveform 1514. This particular waveform includes the combined effects of red, green and blue bar codes, and is used to separate the different color components out of the composite video signal, thereby separating the red and green signals at lines 1461 and 1462. Video decoder 1403 may therefore decode the red and green bar codes at different times, as specified by multiplexer 1405, and the different colored bar codes within the video frame may all be decoded. Circuitry similar to that described with respect to FIG. 12 may, of course, be used to allow multiplexer 1405 to provide an identification code indicating to a computer, etc., which color (red, green or blue) is being decoded by decoder 1403.

In order for the device of FIG. 14 to adequately decode the overlapping and differently colored bar codes of FIG. 15, an approximate 50/50 mix of the colors of both overlapping bar codes must be present in the overlapping area. That is, if a color camera 1401 is used to detect two or more bar codes of differing colors in the same video frame, then the color of the overlapping area of the bar codes must be an additive result of the two base colors, as opposed to one of the bar code colors merely replacing the other bar code color. If one of the bar code colors is partially hidden by the other bar code color, as opposed to being added to it, then only the bar code color in front will be detected in that particular area.

While each color input 1461, 1462 and 1463 may be used independently in one embodiment of the present invention, as described above, the overall luminance of overlapping bar codes of different colors, such as the luminance shown as waveform 1514 of FIG. 15 may be used as well, in order to achieve different results. For example, it may be advantageous to not treat each colored bar code differently, but instead to treat the different bar codes together as one bar code. In that case, the overall luminance may be digitized and provided to decoder 1403 for further processing.

Figure 16:
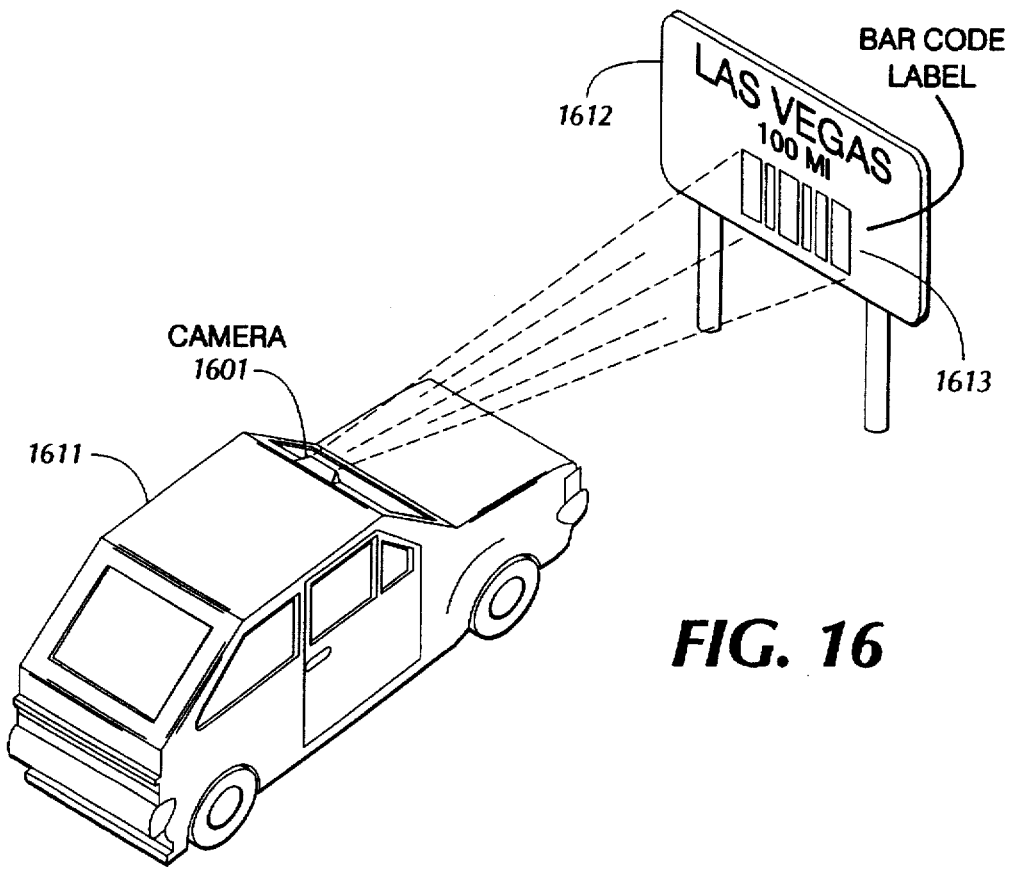
FIG. 16 depicts a perspective view of an application of the present invention, whereby a bar code is placed on a road sign, and an automobile is able to detect, decode and process the data represented by the bar code.

Another highly useful application of the present base technology is in the automobile navigation environment. Referring to FIG. 16, a three-dimensional perspective depiction of an automobile 1611 and a road sign 1612 (such as those found on highways) is shown. A camera 1601 may be mounted on the automobile 1601, such as on the dashboard facing out the front windshield of the vehicle. A bar code 1613 may be placed on the road sign 1612 with sufficient contrast and size so as to be visible to the camera 1601 when the automobile 1601 passes by the road sign 1612. In one embodiment, such a bar code 1613 may be placed on an existing road sign 1612.

The particular bar code 1613 may be chosen to correspond to the information printed on the road sign, such as milage distance to the next town, speed limit information, upcoming exit information, gas station and hotel information etc. The camera 1601 may be connected to a digitizer/decoder (such as decoder 903 in FIG. 9, but not specifically shown in FIG. 16), which may be in turn connected to a computer (not shown). The computer may compare the bar code detected by the camera 1601 and decoded by the decoder with a list of possible bar code data in memory, and may then process this information accordingly. For example, the computer may maintain latitudinal and longitudinal information concerning each bar-coded road sign 1612, and provide the user with a visual display of a map and the user's present location. The computer may also maintain statistical information concerning the user's journey, such as miles travelled, etc.

In another embodiment, the user may, based upon prior information concerning the trip route, program the computer with the user's desired route. If the computer decodes a bar code 1613 from a passing road sign 1612 which should not have been encountered, based upon the programmed route, the computer may notify the user that the user is no longer on course. Alternatively, based upon the bar codes 1613 decoded from the road signs 1612, the computer may give periodic indications to the user as to upcoming exits, turns, etc. Additionally, in order to facilitate the ability of camera 1601 to detect and provide a suitable video signal to a decoder for decoding a bar code on a road sign 1612 at night, reflective sign paint may be used to apply the bar code to the road sign 1612, which would reflect light off of the user's headlights, and back at the camera 1601. As can be seen by the previous discussion, the configuration of the present invention as shown in FIG. 16 has many possible applications and possible configuration modifications, which will be readily apparent to a person having ordinary skill in the art.

The present invention may also be implemented in a printed circuit board (PCB) manufacturing process, whereby a "pick and place" scheme for mounting components is devised. Particularly, the various components to be mounted on a PCB may be labelled with a bar code corresponding to the type of component and may be layed out on a surface. A video signal from a video camera which is viewing the various components from above may be digitized and decoded by the teachings of the present invention so as to allow the automatic "picking" of a component out of the available components and the "placing" of the component in an appropriate space on the electronic circuit board. One of ordinary skill will readily recognize the specific hardware and processes which may be utilized in order to implement such a "pick-and-place" system.

The present invention may also be of particular importance for the manufacturing of particular products with minor variances between model numbers. By placing a small bar code label on a predetermined area of each circuit board, the computer system may be programmed to check for a change from the preceding bar code label to indicate that different components from the preceding circuit board need to be used to make the current circuit board. The recognition of the varying components for each circuit board allows the "pick-and-place" system to manufacture different boards sequentially utilizing the same equipment.

Figure 17A:
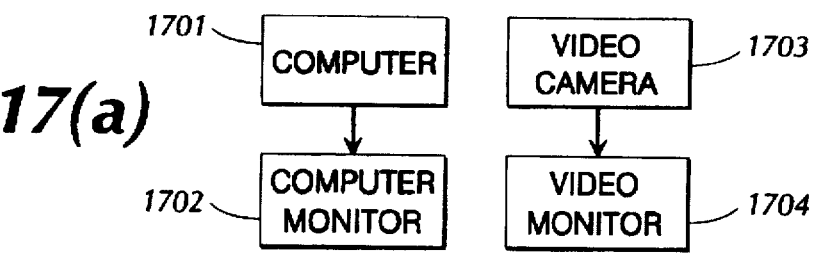
FIGS. 17(a) and 17(b) depict an application of the present invention in a "pick and place" manufacturing environment.

For example, FIG. 17(a) depicts a block diagram of a standard pick and place system which does not utilize the video bar code decoding features of the present invention. The pick and place system of FIG. 17(a) may include a computer 1701 and computer monitor 1702 for displaying output from computer 1701, as well as a video camera 1703 and video monitor 1704 for displaying output from video camera 1703. However, such a pick and place system does not provide for significant interaction between the computer/computer monitor pair and the video camera/video monitor pair.

Figure 17B:
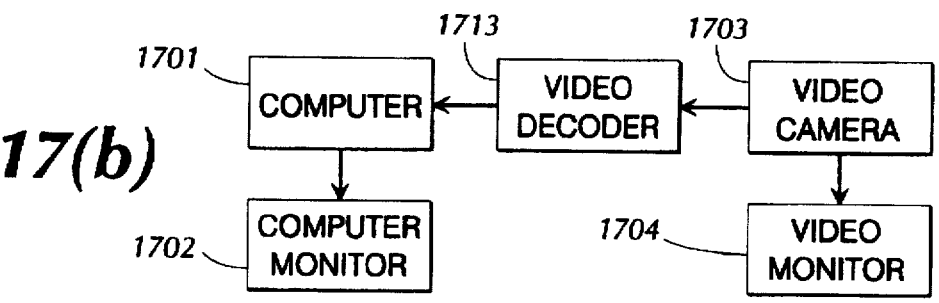

In contrast, a pick and place system according to the present invention is shown in FIG. 17(b). As shown in FIG. 17(b), the computer 1701 and video camera 1703 may be interfaced via the video decoder 1713 (comprising, for example, digitizer 202 and decoder 203 as shown in FIG. 2) of the present invention. In this way, the computer 1701 may decode bar codes within the video frame provided by video camera 1703, such as bar codes printed onto the surface of components or onto the surface of printed circuit boards. The computer 1701 may thereafter determine the location of specific components, instruct specific mechanisms to "pick" up the components, and instruct these mechanisms to place the components in the appropriate place on the PCB.

In order for a computer (such as computer 1701 in FIG. 17) to determine the vertical and horizontal location of a bar code within a video frame in accordance with the present invention, certain techniques may be used. Specifically, a composite video signal generated by a video camera may generally be described as an array of electronic signals generated by light variables hitting a light sensitive material. Each location in this array is called a "pixel" (short for "picture element"). The start of every video frame of a video signal begins with a vertical synchronization (sync) pulse.

Furthermore, the start of every horizontal line of a video signal begins with a pulse, called the horizontal sync pulse. Thus, in order to determine where within a sequential video signal a particular horizontal and vertical location occurs, one may count the number of horizontal lines until the specified horizontal line is encountered, and then choose that portion within the horizontal line based upon a certain time period after the beginning of a horizontal sync pulse.

Figure 18:
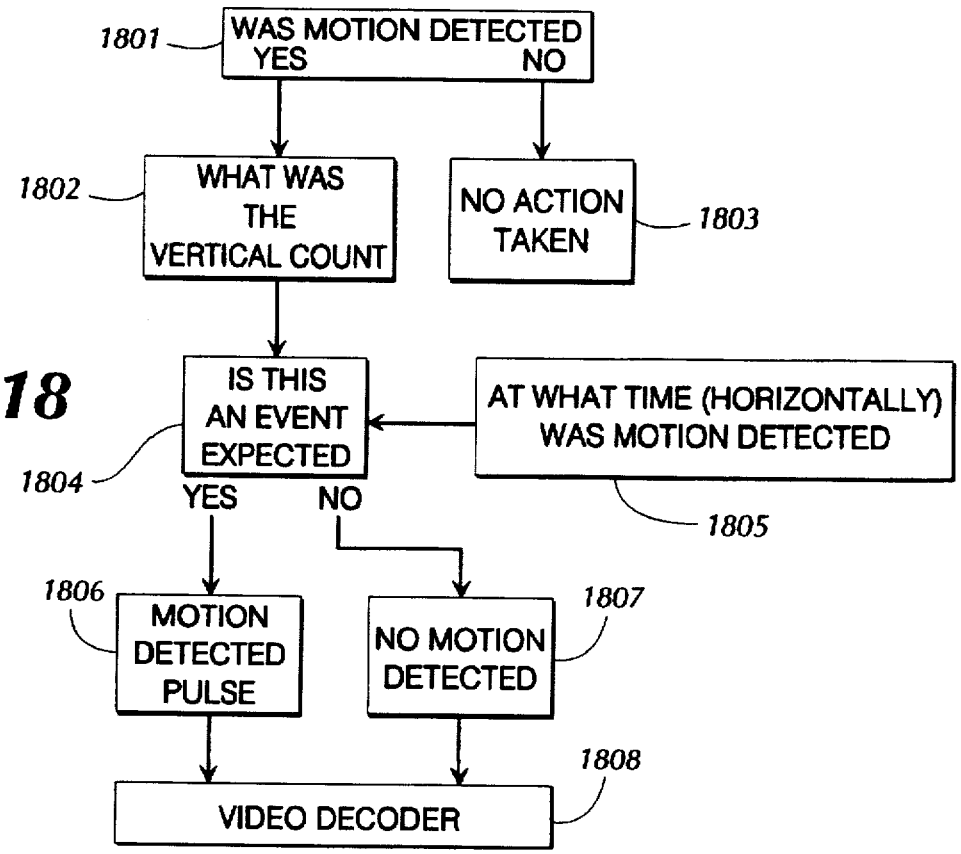
FIG. 18 depicts a flow diagram which illustrates a process for detecting an event or motion within a predetermined area of a video frame and for decoding a bar code with the predetermined area.

An additional application of the base technology of the present invention is illustrated in FIG. 18. Particularly, by combining the ability to count the horizontal sync pulses and to interpolate within a horizontal line in order to choose a specific horizontal location within the horizontal line, a specified point or region within the two-dimensional matrix of a video frame can be isolated. This ability may allow one to determine whether an "event" or "motion" has taken place within a predetermined area of the video frame so as to detect, for example, a bar code found therein.

Referring to FIG. 18, a flow diagram is provided, in one embodiment, which illustrates a process for detecting an event or motion within a predetermined area of the video frame. First, at step 1801, it is determined whether motion was detected within a specified area of the two-dimensional video frame. This determination may be made by examining the horizontal video data within a video frame, and comparing this data from frame to frame. If a significant change has occurred between frames, then motion may be considered to have been detected, and step 1802 is encountered. Otherwise, step 1803 is encountered.

If no motion was detected, then no action is taken, as shown by step 1803. Alternatively, if motion was detected, then step 1802 is encountered, and a count of the horizontal lines is made, as explained previously. Specifically, the horizontal sync pulses may be counted after a vertical sync pulse has occurred, at which point a count of the line number is known at the time motion is detected. Thus, by the time that motion is detected in one or more horizontal lines, a count of the particular horizontal line(s) (which corresponds to the vertical position of the line) is already known.

Similarly, at step 1805, the horizontal location where motion was detected may be calculated by interpolating based upon the time duration of an entire horizontal line. Thus, when motion is detected at a certain point on a horizontal line, the horizontal position on the line may be determined.

Both vertical and horizontal positions of the motion within the video frame are therefore provided to step 1804, which thereafter determines whether the particular motion/event was expected. A computer, for example, performing the steps of FIG. 18 may be previously programmed with the coordinates of the area wherein events are to be expected. Thereafter, step 1804 may compare the vertical and horizontal position of the detected motion/event with the preprogrammed position(s), and may thus determine whether the motion/event was expected.

If the event was expected, then step 1806 is encountered, and a "motion detected" pulse may be provided to video decoder 1808 (which corresponds to vide decoder 203, video decoder 903, etc., of FIGS. 2, 9, etc.). Video decoder 1808 is thereby activated, and may decode, for example, a bar code which might exist within the predetermined area of the video frame. If the particular motion was not expected, then step 1807 is encountered, and no activation pulse is provided to video decoder 1808. In this way, video decoder is activated only when an event or motion occurs in a preselected area of the video frame. Bar codes, for example, moving into other areas of the video frame may therefore not activate video decoder 1808.

Although not necessarily required, the above steps of isolating an event/motion within a preselected area of the video frame may, in some circumstances, be helped by shining, for example, a small beam of light directly on the subject area of interest. Doing so would strongly enhance a strong direct current (DC) signal level change for the specified area. Shining such a light is not, however, required, and the present invention is able to operate without doing so.

Figure 19:
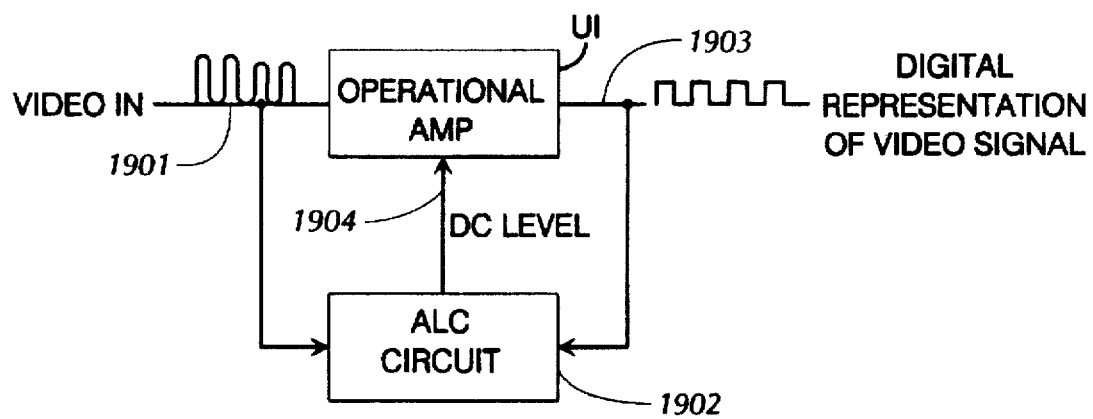
FIG. 19 depicts an automatic level control circuit for use with the present invention.

In order to compensate for ambient light levels when using the video decoder of the present invention, an automatic level control (ALC) circuit may be utilized, as depicted in FIG. 19. Different backgrounds and light conditions can change the optimal DC level of comparator/op amp U1 shown and described previously in and with respect to FIG. 4. As shown in FIG. 19, ALC circuit 1902 receives the DC voltage on line 1903 (which corresponds to pin 6 of comparator U1 of FIG. 4), receives the DC voltage on line 1901 (which corresponds to line 201 of FIG. 4), and provides an optimized DC level on line 1904 to operational amplifier U1. The optimized DC level thus takes into account any DC offset level of incoming video signal on line 1901, and provides a suitable DC level for output on line 1903. The suitable DC level may be determined according to the discussion of the same with respect to FIG. 4.

Figure 20:
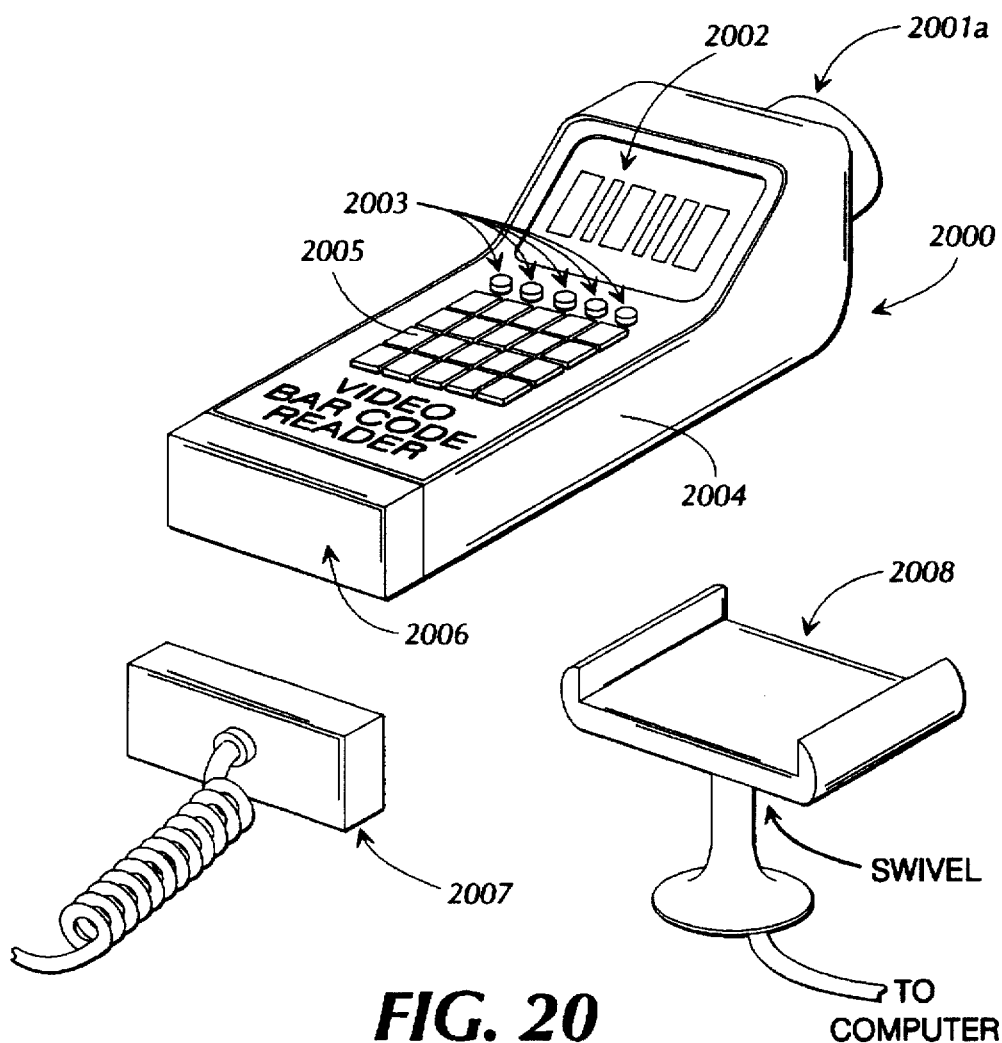
FIG. 20 depicts a hand-held video bar code reader system, according to the teachings of the present invention.

Another embodiment of the present invention is shown in FIG. 20. Particularly, FIG. 20 is a perspective view of a hand-held video bar code reader system incorporating several components into one unit 2000, as described in further detail below.

In a preferred embodiment, unit 2000 may comprise a case 2004 approximately 8 inches long and 3 inches wide, but of course, the size of the case is not important to the functional aspects of the unit. The unit may operate off of a 12 VDC power source, and in its normal operating mode, the unit may draw, for example, 400 mAmps/hour.

Generally, the bar code reader system of FIG. 20 comprises a visual display system, which includes, for example, an LCD display 2002 and light-emitting diodes (LEDs) 2003. A camera, not specifically shown, but residing within unit 2000, is included which may comprise a camera such as those referred to be numeral 901 or 1001 in FIGS. 9 and 10, respectively. Camera lens system 2001a may comprise a lens as previously described with respect to, for example, FIGS. 10(a) and 10(b). Keypad 2005 may be provided to allow for a user of unit 2000 to control its operation. An RF or IF adaptor 2006 may also be provided for transmitting data to a suitably equipped computer or video decoder.

In one implementation of the embodiment of the present invention shown in FIG. 20, no decoding of bar code data within the video frame detected by the internal camera is done within unit 2000. Rather, unit 2000 may transmit the video signal to a remote video decoder (not specifically shown, but described previously with respect to, for example, FIGS. 2, 9, etc.) via RF/IF adaptor 2006, or coiled cord adapter 2007.

In one embodiment of operation, which may be selected via keypad 2005, the unit 2000 is designed to stay "OFF" when not being used. When a bar code is detected in the field of view of the camera (e.g., within the video frame), and the user wishes to send the corresponding video signal to a remote video decoder, the user may simply press a "TRANSMIT" button on keypad 2005. In another embodiment, if no motion of unit 2000 is detected by a vibration sensor, the unit will shut off automatically. In still another embodiment, the teachings of FIG. 18 may be implemented, where if no events or motion within a selected portion of the video frame is detected, then any bar code within that selected portion is not decoded.

The LCD display 2002 may be used to show the output of the camera, as well as the output screen of a computer system (not specifically shown) used for controlling the unit 2000 (hence possibly eliminating the need to use a separate monitor for the computer). Additionally, the various settings of the unit 2000 may be displayed on LCD display 2002, either under control of the unit 2000 itself, or under control of an external controlling computer. Both incoming and outgoing video signals (not specifically shown) to unit 2000 may be standard composite video signals (such as NTSC), and unit 2000 may conceptually operate, in part, according to the functionality described previously with respect to FIG. 9, et seq.

An added feature which may be implemented in unit 2000 of FIG. 20 is its ability to allow a user to pre-program several commands that help control the transmission of bar code data detected within the video frame of the camera to the external computer. For example, command such as "SEND", "NEXT SCREEN", "PREVIOUS SCREEN" and "NEXT FIELD" may be accessible via keypad 2005, and may allow the user to instruct that the video signal be sent to the video decoder for decoding, and to instruct the computer to accept the decoded bar code data, then go to the next task, all without having to physically be present at the computer's normal keyboard. One of ordinary skill in the art will readily recognize the broad range of possibilities for remotely controlling an external computer from the keyboard of unit 2000.

Another embodiment of the present invention as depicted in FIG. 20 is a swivel fixed station cradle 2008, which may be used to connect unit 2000 to, for example, an external computer and/or a battery charging unit. Such a cradle 2008 may be used in a fixed station environment, where all of the components of FIG. 20 (including a video decoder and external computer, not specifically shown) are physically used together. The battery recharging feature of such a system may be designed to quick charge a battery capacitor-like cell, such as a BP-3 available from Kyosho. For example, a 15 second charge might allow an approximate 3 minutes of normal operational use, without the need for a full recharging cycle. This type of power source does not require conventional batteries, nor does it develop storage memory problems associated with nickel-cadmium-type rechargeable batteries.

The transfer of power from cradle 2008 to the capacitor-like cell of unit 2000 may be performed via inductance. This will eliminate the need for any external ports or wires on the hand held unit 2000. Simply placing the unit 2000 on cradle 2008 may activate a power surge into unit 2000, and fill the battery/capacitor to its capacity.

In normal use, a user of the unit 2000 in conjunction with cradle 2008 may simply read bar code data within the video frame of the internal camera, transmit this data to a video decoder, etc., and then place the unit 2000 in the cradle 2008 to constantly maintain a good charge level. The unit may be designed to operate within, for example, 30 feet of the cradle 2008, and the cradle 2008 may be attached to the video decoder (not specifically shown) which decodes the bar codes.

As previously described, adaptor 2006 may be used to transmit of, for example, a video signal from unit 2000 to external devices. In one embodiment, the transfer of a signal from cradle 2008 to unit 2000, and vice versa, may be accomplished via suitable radio frequencies, such as 439.25 MHz, using commonly available components, such as a SATV-1 available from Supercircuits as a transmitter and a ATV-K also available from Supercircuits as a receiver.

Figure 21:
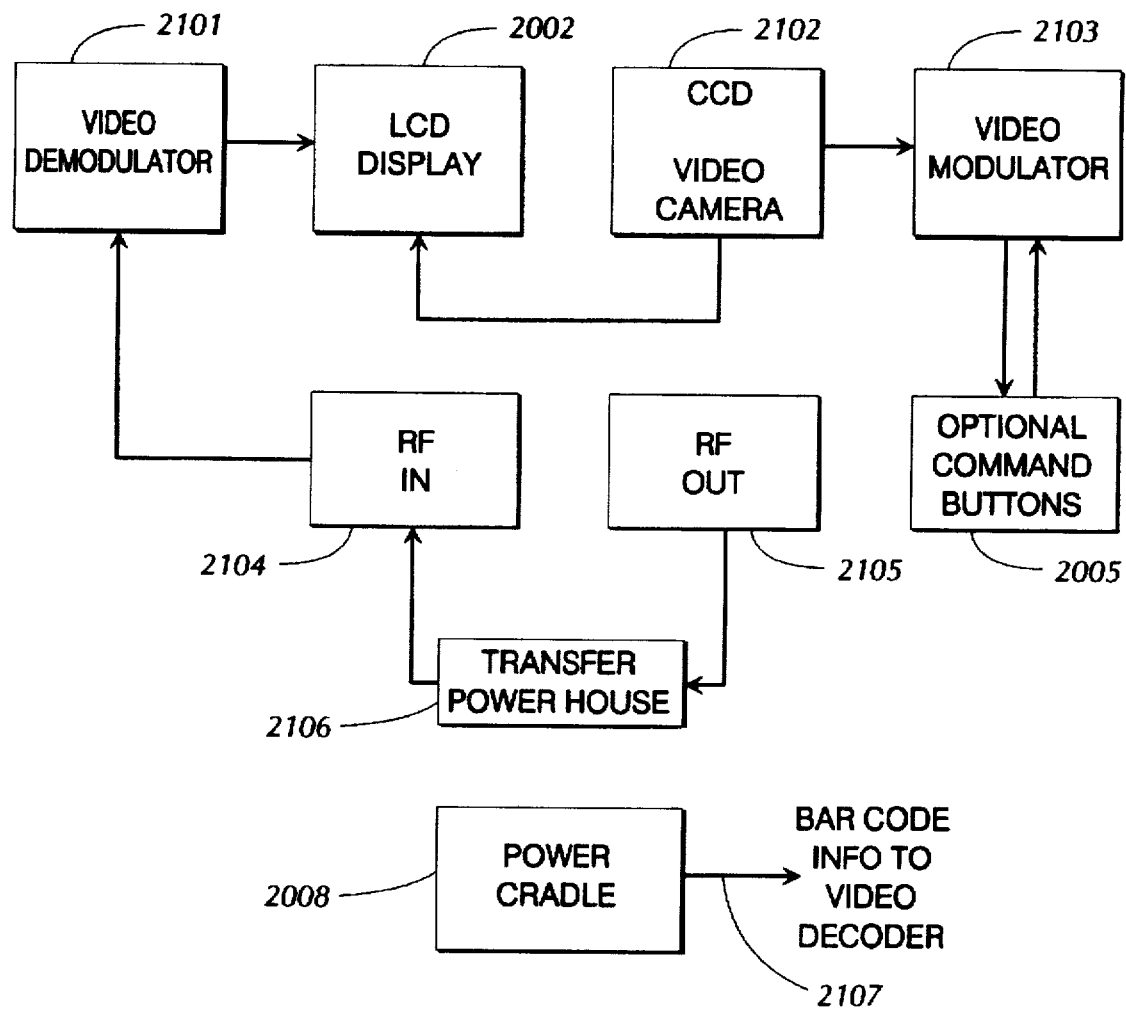
FIG. 21 depicts a block diagram of the major functional components of the hand-held video bar code reader system of FIG. 20.

FIG. 21 depicts a block diagram of the major components of the hand-held unit (and accompanying components) of FIG. 20. Particularly, CCD video camera 2102, corresponding to the camera not specifically shown within FIG. 20 and camera 901 of FIG. 9, etc., may comprise a typical CCD video camera, capable of producing a high resolution CCD image. The lens system of camera 2102 may include auto-focus, auto-iris, auto-zoom, etc., as described with respect to FIG. 10(a) and 10(b).

The output of video camera 2102 is supplied to LCD display 2002. Alternatively, video demodulator 2101 may operate to demodulate a video signal (such as from an external computer) supplied as a RF input through line 2104 from a transfer power house 2106. Transfer power house operates both to supply power to the unit of FIG. 21, as well as transferring a video signal from, for example, an external computer, through power cradle 2008, and to video demodulator 2101 for demodulation and display on LCD display 2002. The capacitor in transfer power house 2106 may also be charged by induction via cradle 2008.

The output of camera 2102 may also be provided to video modulator 2103 under control of command buttons on keypad 2005. The command buttons 2005 may be used to selectively send the video signal through RF out line 2105 to transfer power house 2106 for transfer to an external video decoder through cradle 2008 and line 2107, as previously described. The output of the external video decoder may also be provided to an external computer for further processing.

Still another embodiment of the present invention is shown in FIG. 22(a). Particularly, FIG. 22(a) discloses the use of the teachings of the present invention within a walking stick or walking cane. As shown in FIG. 22(a), a walking stick (cane) 2200 is provided which includes a camera/lens/mirror portion 2250 which is able to convert a field of view into a video signal.

Portion 2250, which is also shown in an exploded view in FIG. 22(b), may include a camera 2201 and a lens 2201a for capturing an visual image. Mirror 2210 may be positioned adjacent lens 2201a and image port 2230 so as to allow a field of view (which may include a bar code 2231) to be supplied to camera 2201 through lens 2201a. In one embodiment, image port 2230 may be made of sapphire so as to allow light to pass therethrough.

Walking stick 2200 may also include video decoder 2203, which may receive the output from camera 2201 so as to decode a bar code within the video signal generated by the camera 2201, and a computer 2204 for processing the output of video decoder 2203. Camera 2201, video decoder 2203 and computer 2204 may operate in a manner similar to corresponding components previously discussed (such as camera 901, video decoder 903, etc.). Batteries 2205 may also be provided so as to provide power to camera 2201, video decoder 2203, computer 2204, etc.

Additional components may also be included with walking stick 2200, including compass 2232, headphones 2212 (for users able to hear), a vibrating mechanism (for users unable to hear), 20,000 volt zapper 2211, etc.

In operation, the walking stick 2200 and related components may be used by, for example, a blind person in order to assist with navigation. In one embodiment, visually perceptible bar codes may be placed on street signs, buildings, automobiles, etc., which may be detected and decoded by camera 2201 (with lens 2201a), video decoder 2203, computer 2204, etc. The computer 2204 may thereafter provide information to the user, either through head phones 2212, or through a vibrating mechanism (not shown).

To illustrate, suppose a user of the walking cane 2200 was approaching "PEACHTREE STREET" in Atlanta, Ga., and a street sign on this street included both the printed name of the street and a bar code corresponding to the street name. Assuming that the street sign was within the field of view of camera 2201 (and lens 2201a), the street sign (including the bar code printed thereon) would be present within the video signal, and video decoder 2203 would readily be able to decode the bar code. Based upon, for example, a lookup table, computer 2204 could discern the particular street name based upon the coded street name bar code, and could direct that the street name be provided to the user, with the assistance of suitable voice synthesis means, via head phones 2212 (assuming the user was able to hear).

Figure 22:
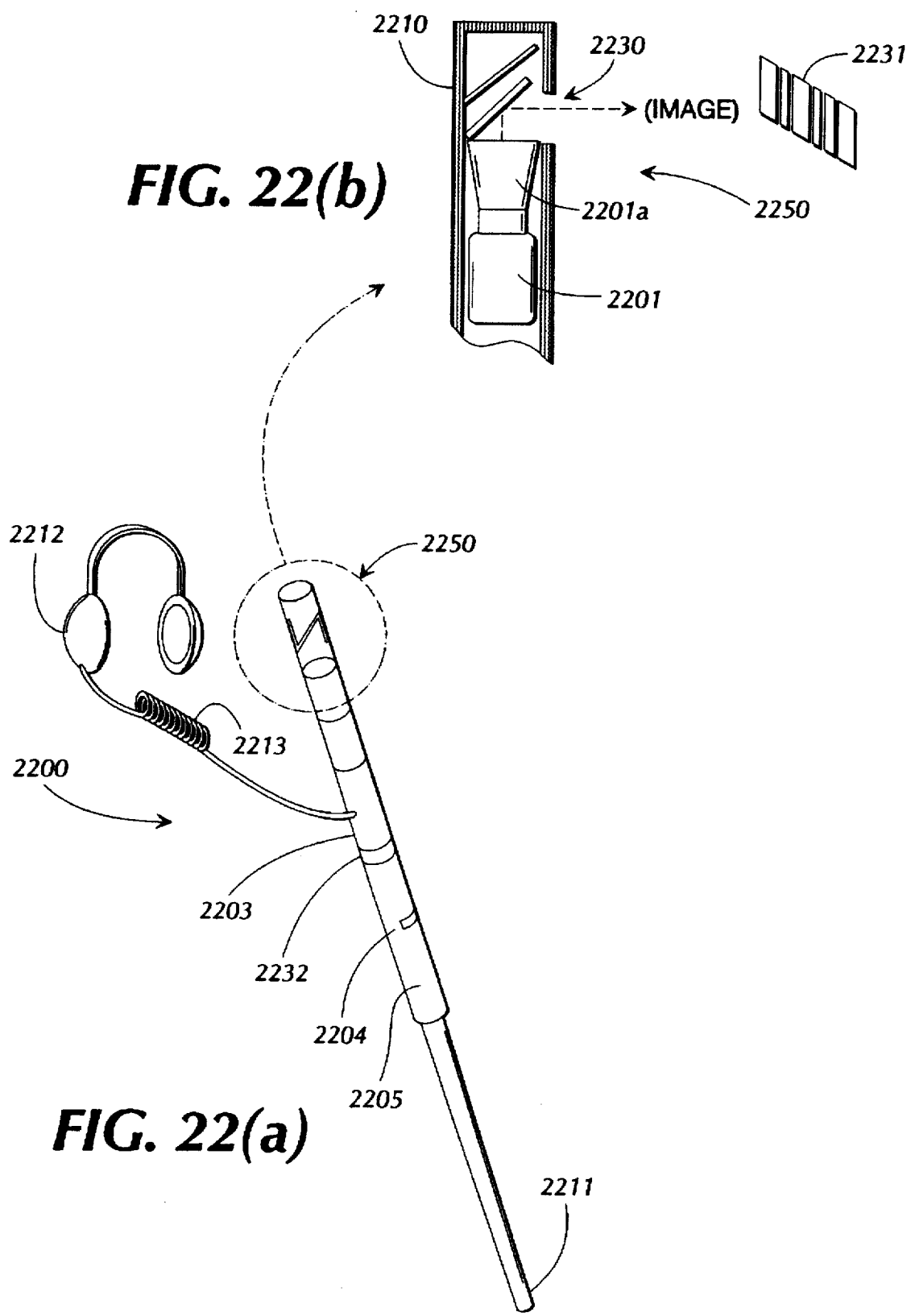
FIGS. 22(a) and 22(b) depict an embodiment of the application of the present invention in a walking stick or walking cane environment.

Numerous other applications of the walking stick 2200 of FIG. 22 are also possible, as will be readily recognized by one of ordinary skill in the pertinent art. For example, any of the applications described with respect to FIG. 16 could easily be adapted to the device of FIG. 22.

In addition to the decoding of bar codes detected by camera 2201, the walking stick 2200 may also include compass 2232 which may be used in order to inform a user of his or her general direction. That is, computer 2204 may receive as input a signal from compass 2232 (which may be an electronic compass recognized by one of ordinary skill in the art), and may provide this information to the user, either through audible indications through head phones 2212, or through vibrational movement. Of course, information obtained by computer 2204 from bar codes decoded by video decoder 2203 may be combined with information obtained from compass 2232, so as to, for example, provide an automated guidance system for the user. That is, computer 2204, "knowing" the location of the user based upon the last bar code decoded, may then guide the user based upon the proper direction in which to head, all based upon preprogrammed route information provided to the computer 2204.

Finally, 20,000 volt zapper 2211, which may be placed on the end of walking stick 2200, may be operated via a switch on walking stick 2200 in order to temporarily inhibit an attack by animals or people. Of course, this feature, the volt zapper, is not necessary to the operation of this embodiment, and is therefore not required for the present invention.

Figure 23:
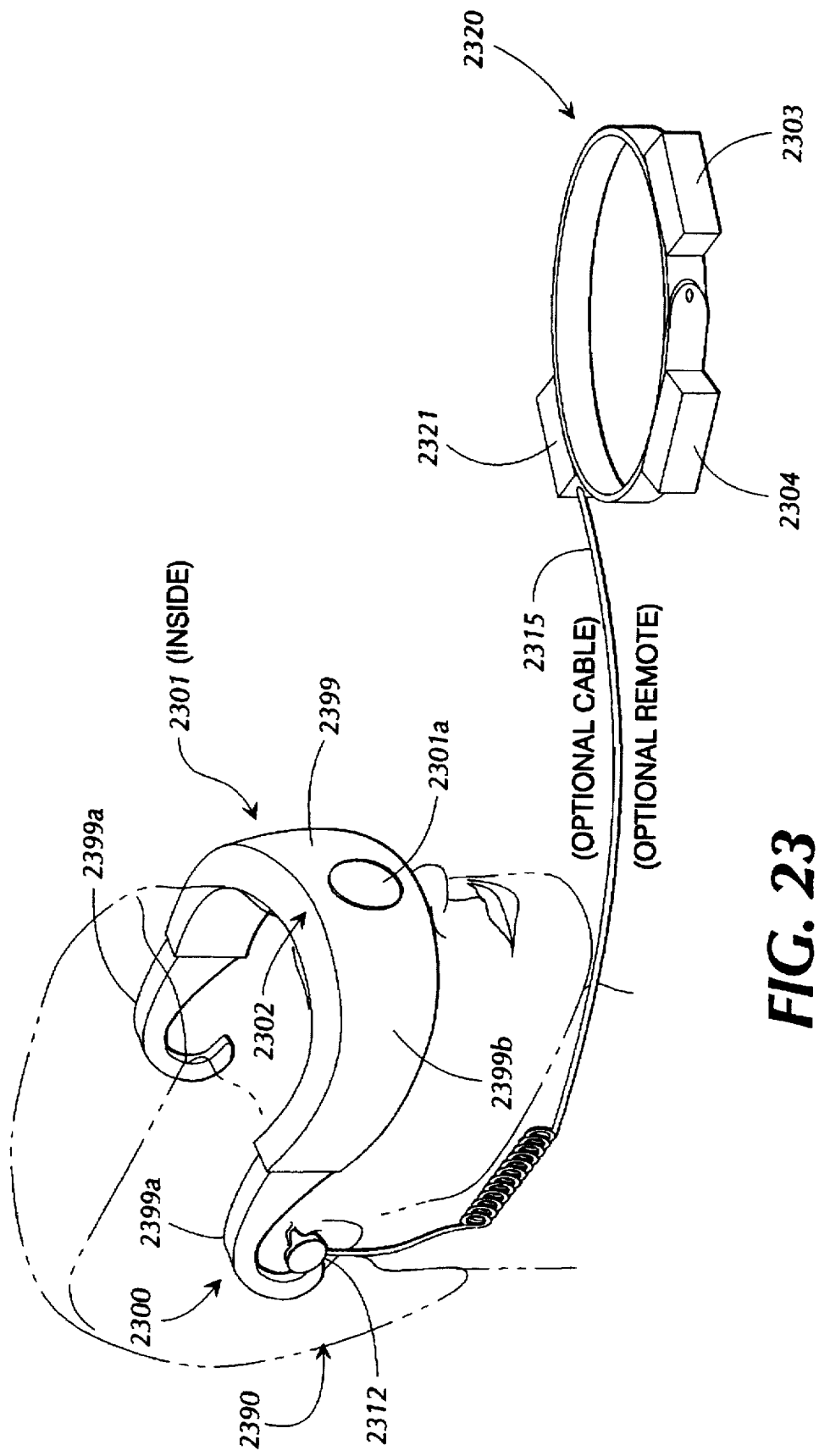
FIG. 23 depicts a bar code reader according to the teachings of the present invention which may be mounted on a user's head.

A final embodiment of the present invention is depicted in FIG. 23. FIG. 23 discloses a head mounted bar code reader (referred to generally as reference numeral 2300), which may include a video decoder (analogous to, for example, decoder 903 in FIG. 9) for decoding bar codes within the video frame of an attached camera 2301, which may be mounted within the head mounted bar code reader 2300.

In a preferred implementation, the head mounted bar coder reader 2300 may include a housing 2399 including rear portions 2399a, which may fit around the ears of a user 2390, and a front portion 2399b, which may fit over the eyes of the user 2390. An ear plug 2312 (which may also comprise a vibrating mechanism for those who have trouble hearing), analogous to head phones 2212 of FIG. 22, may be attached to an appropriate connector on one side of housing 2399, and may be used to provide audible information to the user 2390 of unit 2300.

Camera 2301 (not specifically shown, but located inside of housing 2399) may be mounted within the front portion 2399b of unit 2300 in conjunction with a wide angle lens 2301a, so as have a field of view in front of the user. A video monitor, such as a backlit LCD display 2302 (similar to LCD display 2002 of FIG. 20), may be located on the backside of front portion 2399b in close proximity to the user's eyes, so as to provide the user with a visual representation of the field of view as seen by camera 2301.

A cable 2315 may be used to connect the various components associated with unit 2300 (such as camera 2301, ear phone 2312, etc.) with a video decoder 2303 and computer 2304, which, in a preferred embodiment, may be located on a belt 2320 worn around the waist of the user. Video decoder 2303 and computer 2304 may be powered by, for example, battery 2321. Video decoder 2303 and computer 2304 may operate analogously to the video decoders described previously with respect to the other figures of the present specification.

The device of FIG. 23 may operate in a manner similar to the devices depicted in FIGS. 9, 16, 20, etc., as described in the accompanying specification. That is, the camera 2301, through lens 2301a, may receive an image, and convert this image into a composite video signal corresponding to a video frame. The composite video signal may be provided, via cable 2315, to video decoder 2303, which may decode any bar codes within the video signal, and the results thereof may be provided to computer 2304 for further processing. In one embodiment, computer 2304 may interpret any decoded bar codes within the video signal, and provide a corresponding audible signal to the user 2390 via ear plug 2312. One of ordinary skill in the art will recognize the wide range of uses of such a device.

What has been described above are preferred embodiments of the present invention. It is of course not possible to describe every conceivable combination of components for purposes of describing the present invention, but one of ordinary skill in the art will recognize that many further combinations and permutations of the present invention are possible. All such possible modifications are to be included within the scope of the claimed invention, as defined by the appended claims below.

I claim:

1. A bar code decoding system for decoding a bar code represented within a video signal, said bar code decoding system comprising:
   (a) a plurality of video sources for generating said video signal, wherein said video signal comprises a video data portion and a synchronization portion,
      a multiplexer for selecting one of said plurality of video sources, and
      a controller for controlling said multiplexer responsive to a preselected selection scheme; and
   (b) a video decoder coupled to said plurality of video sources for continuously receiving the video signal from said video sources and for continuously decoding the bar code represented within said video signal.

2. The bar code decoding system of claim 1, further comprising:
   (c) a processor coupled to said video decoder for processing the bar code after it has been decoded.

3. The bar code decoding system of claim 2, wherein said processor is a computer.

4. The bar code decoding system of claim 1, wherein said video source is a video tape recorder.

5. The bar code decoding system of claim 1, wherein said video source is a television video signal transmission.

6. The bar code decoding system of claim 1, wherein said video source is a video cassette recorder (VCR).

7. The bar code decoding system of claim 1, wherein said video source is a video camera.

8. The bar code decoding system of claim 7, wherein said video camera includes an automatic focus lens.

9. The bar code decoding system of claim 7, wherein said video camera includes an automatic iris.

10. The bar code decoding system of claim 7, wherein said video camera includes an automatic zoom lens.

11. The bar code decoding system of claim 7, wherein said video camera is a color video camera.

12. The bar code decoding system of claim 7, wherein said video camera is positioned to view the bar code on a component for use on a circuit board.

13. The bar code decoding system of claim 7, wherein said video camera is positioned to view the bar code on a circuit board.

14. The bar code decoding system of claim 7, further comprising a means coupled to said video camera for detecting a change within a predetermined area of said video frame as compared to a preceding said video frame.

15. The bar code decoding system of claim 7, further comprising a means coupled to said video camera for determining the vertical and horizontal location of the bar code within said video frame.

16. The bar code decoding system of claim 1, wherein said video decoder comprises:
   (i) a means for converting said video signal into at least one digitized data signal, and
   (ii) a means for decoding the bar code represented within said at least one digitized data signal.

17. The bar code decoding system of claim 1, wherein said video source further comprises:
   (iv) means associated with each of said plurality of video sources for generating within said composite video signal an identification signal corresponding to the particular video source.

18. The bar code decoding system of claim 17, wherein said video decoder includes:
   means for decoding said identification signal.

19. The bar code decoding system of claim 1, wherein said video signal generated by said video source includes a representation of a plurality of bar codes.

20. The bar code decoding system of claim 19, wherein said video decoder includes a means for decoding said plurality of bar codes from said video signal.

21. The bar code decoding system of claim 1, wherein said video decoder includes an automatic level control (ALC) for compensating for different lighting conditions.

22. A bar code decoding system comprising:
   at least two video cameras, each configured to generate a composite video signal representative of an image area viewed by the camera, the composite video signal having a video data portion and a synchronization portion, the at least two video cameras being directed in generally the same direction to view a common image area, but being disposed at different orientations;
   means for digitizing the composite video signal of each of the at least two video cameras;
   a video decoder responsive to the video data portion of the digitized video signal of each of the at least two video cameras for decoding an identifiable bar code sequence embedded within said video signal;
   means responsive to the decoder for indicating that a bar code sequence has been identified within the video signal of at least one of the video cameras; and
   said two video cameras being maintained in a fixed relation and said common image area is defined on an object that is controllably disposed within the image area of each of the cameras.

23. The bar code decoding system as defined in claim 22, wherein the image areas of the at least two cameras at least partially overlap.

24. The bar code decoding system as defined in claim 22, further including means for manipulating the object, wherein the common image area of the object is first disposed within the image area of one of the at least two video cameras, and thereafter moving the object to dispose the common image area in the image area of a second of the at least two video cameras.

25. The bar code decoding system as defined in claim 22, wherein the at least two video cameras include a first and second video camera, the first video camera being disposed so that the image area of the first video camera is oriented at substantially 90 degrees rotation from the image area of the second video camera, with respect to the common image area.

* * * * *

UNITED STATES PATENT AND TRADEMARK OFFICE
CERTIFICATE OF CORRECTION

PATENT NO. : 5,682,030
DATED : October 28, 1997
INVENTOR(S) : Kubon, Daniel G.

It is certified that error appears in the above-identified patent and that said Letters Patent is hereby corrected as shown below:

<u>Title page,</u>
Insert Item:
-- [73] Assignee: Label Vision Systems, Inc. Peachtree City, Georgia --.

Signed and Sealed this

Seventh Day of February, 2006

JON W. DUDAS
*Director of the United States Patent and Trademark Office*